United States Patent

Funatsu et al.

[11] Patent Number: 5,243,004

[45] Date of Patent: * Sep. 7, 1993

[54] ELECTRON CONDUCTIVE HIGH MOLECULAR COMPOUNDS AND ELECTRIC CONDUCTIVE MATERIALS USING THEM

[75] Inventors: Eiji Funatsu; Tadahiko Kubota; Shigetoshi Ono, all of Kanagawa, Japan

[73] Assignee: Fuji Photo Film Co. Ltd., Kanagawa, Japan

[*] Notice: The portion of the term of this patent subsequent to May 19, 2009 has been disclaimed.

[21] Appl. No.: 671,333

[22] Filed: Mar. 19, 1991

[30] Foreign Application Priority Data

Mar. 19, 1990 [JP] Japan .................................. 2-69272
Mar. 20, 1990 [JP] Japan .................................. 2-71177

[51] Int. Cl.$^5$ .................. C08F 228/06; C08F 226/06; C08F 226/00; C08F 228/02; C08F 12/28; C08F 216/12

[52] U.S. Cl. .................................. 526/256; 526/258; 526/270; 526/287; 526/288; 526/310; 526/333

[58] Field of Search .................................. 526/259, 256

[56] References Cited

U.S. PATENT DOCUMENTS 5,115,057  5/1992  Ono et al. .................................. 526/256

Primary Examiner—Joseph L. Schofer
Assistant Examiner—Wu C. Cheng
Attorney, Agent, or Firm—Sughrue, Mion, Zinn, Macpeak & Seas

[57] ABSTRACT

An electron conductive high molecular compound comprising an ethylenic repeating unit having an electron conductive moiety composed of a compound comprising at least one repeating unit of an aniline compound or a heterocyclic compound as a repeating unit at the side chain and further having a repeating unit of an oxyalkylene group at the linked portion of the repeating unit of the electron conductive moiety and the main chain thereof.

13 Claims, 1 Drawing Sheet

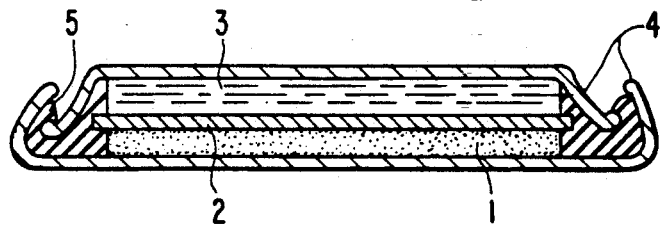
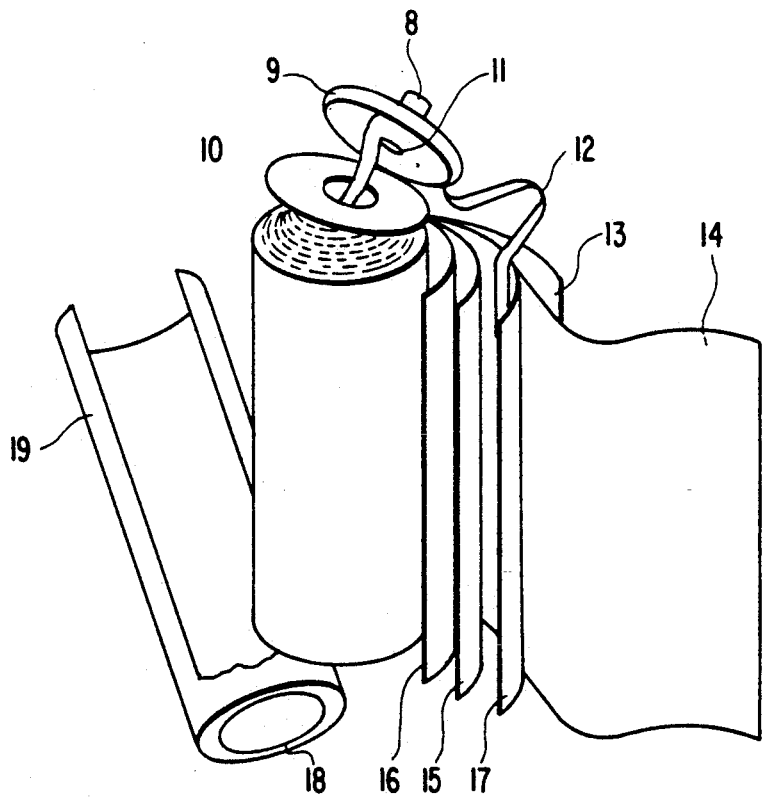

ELECTRON CONDUCTIVE HIGH MOLECULAR COMPOUNDS AND ELECTRIC CONDUCTIVE MATERIALS USING THEM

FIELD OF THE INVENTION

The present invention relates to a novel electron conductive high molecular compound which can be applied as antistatic materials for plastics and electric conductive materials in a wide range, such as batteries, condensers, electron devices, electrodes of electrochromic elements, electrolyte materials, plane heaters, electromagnetic shielding materials, etc., in the fields of electric and electronic industries.

BACKGROUND OF THE INVENTION

Recently, in the field of organic high molecular materials having an electron conductivity, the applications for batteries and various functional devices have been investigated.

Examples of such useful organic high molecular materials include polyaniline, polythiophene, polypyrrole, polyphenylenevinylene, polyphenyleneacetylene, and polyacetylene and practical examples thereof are described in West German Patents 3,223,544, 3,318,856, 3,318,857, 3,325,892, 3,338,904, and 3,421,296, JP-A-58-187432, JP-A-59-43060, JP-A-59-112583, JP-A-58-209864, JP-A-59-207933, JP-A-60-120722, JP-A-60-67527, JP-A-62-225518, JP-A-62-53328, JP-A-63-199726, JP-A-60-223817, JP-A-61-83221, JP-A-59-31565, etc. (the term "JP-A" as used herein means an "unexamined published Japanese patent application").

These high molecular materials are excellent in electron conductivity but have disadvantages that they are poor in mechanical strength, are reluctant to dissolve in solvent, and are poor in molding workability. Thus, electron conductive high molecular compounds having excellent electron conductivity and excellent molding workability have been desired.

As an electric conductive material, a combination of the layer of the electron conductive high molecular material and the layer of an electrolyte is used but for sufficiently functioning as electron devices or batteries, it is necessary to quickly conduct the exchange of electrons and ions at interface of both the elements.

It is reported that as an electrolyte, a high molecular solid electrolyte is excellent in the points of causing no liquid leakage, having a high mechanical strength, having a high flexibility of laminated layer material.

As the electrically conductive electronic material composed of combination of such a high molecular solid electrolyte and an electron conductive high molecular material, an organic battery composed of a combination of polyacetylene and a solid electrolyte is proposed in *Polymer*, Vol. 22, 1454-1455 (November, 1981), etc. However, the film of the polyacetylene prepared by an addition polymerization has problems that the oxidation stability is poor, the contact of the film with the high molecular solid electrode at the interface thereof is insufficient, whereby a good electric conductivity is not obtained, and also the response speed as a device material is slow.

Also, JP-A-62-98577 describes a laminated layer type electrically conductive material composed of a combination of a polymer having conjugated double bond at the main chain produced by an electrolytic polymerization and a high molecular solid electrolyte. However, the contact of the electron conductive polymer and the high molecular electrolyte at the interface is insufficient and then an interfacial resistance is increased, whereby a good electric conductivity is not obtained, and also the electrically conductive material is poor in mechanical strength.

Also, as a compound satisfying both the mechanical strength and the electric conducivity, the compound having a repeating unit of a carbazole group at the side chain having the structure shown below was investigated in No. 37 (1988) *Kobunshi Toronkai (Polymer Forum)* 2H04, but the electric conductivity was insufficient as from $1 \times 10^{-4}$ to $1 \times 10^{-5}$ S/cm.

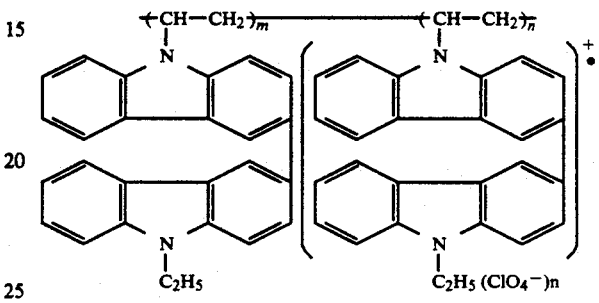

Also, when polyaniline or a polyheterocyclic compound is used as a material for electrode, an anion is doped or dedoped with an oxidation reduction reaction. It is reported by Tekehara et al in No. 56 *Denkikagaku Kai (Electrochemical Society)* 3G24 that in the above-described case, the diffusion of the anion becomes the rate determination step.

As a practical method for preventing the diffusion of anion, a method of using an anionic compound as a doping agent is disclosed in JP-A-63-215772. However, in the method, there is a problem that with repeating doping, a concentration gradient occurs by the diffusion of the anionic compound, whereby the method does not provide a sufficiently improving means.

SUMMARY OF THE INVENTION

A first object of the present invention is to provide an electron conductive high molecular compound which is excellent in electron conductivity and also excellent in mechanical strength and molding workability.

A second object of the present invention is to provide an electron conductive high molecular compound capable of quickly causing the doping reaction and dedoping reaction of an anion in the oxidation reduction reaction of the electron conductive high molecular compound.

A third object of the present invention is to provide an electrically conductive material comprising a laminate of a layer of an electron conductive high molecular compound and a layer of a high molecular solid electrolyte, said electron conductive high molecular compound showing less electric resistance at the contact interface in the case of combining with the high molecular solid electrolyte, having an excellent electric conductivity, and showing a quick response speed as electron device materials.

A fourth object of the present invention is to provide an electrically conductive material without substantially need of an electrolyte layer by imparting a function as a high molecular solid electrolyte to an electron conductive high molecular compound.

It has now been discovered that the above-described objects can be achieved by the electron conductive high molecular compound of the present invention as described hereinbelow and also the electrically conductive material of the present invention using the above-described electron conductive high molecular compound.

That is, according to the 1st embodiment of the present invention, there is provided an electron conductive high molecular compound comprising an ethylenical repeating unit having at least an electron conductive moiety composed of a compound comprising at least one repeating unit of an aniline compound or a heterocyclic compound at the side chain thereof as a repeating unit and having a repeating unit of an oxyalkylene group at the linked portion of the repeating unit of said electron conductive moiety and the main chain thereof, or there is also provided an electrically conductive material using the above-described electron conductive high molecular compound.

According to the 2nd embodiment of the present invention, there is further provided an electron conductive high molecular compound comprising an ethylenical repeating unit having at least an electron conductive moiety composed of a compound comprising at least one repeating unit of an aniline compound or a heterocyclic compound at the side chain as a repeating unit and an ethylenical repeating unit having a cyclic carbonic acid ester, a cyclic ester or a cyclic ether at the side chain, or there is also provided an electrically conductive material using the above-described electron conductive high molecular compound.

BRIEF DESCRIPTION OF THE DRAWINGS

FIG. 1 is a sectional view showing the structure of the battery prepared for the continuous charging and discharging test 1 in the example of this invention and FIG. 2 is a view showing the structure of the battery prepared for the continuous charging and discharging test 2 in the example of this invention.

DETAILED DESCRIPTION OF THE INVENTION

Then, the invention is described in detail.

First, the electron conductive high molecular compound of the present invention is described in detail.

In this invention, the electron conductive moiety composed of at least one of an aniline compound and a heterocyclic compound at the side chain may be one kind or two or more kinds. Furthermore, when two or more electron conductive moieties may be linked by a linkage group.

In the 1st embodiment of the present invention, the electron conductive high molecular compound comprises an ethylenical repeating unit having at least one electron conductive moiety composed of a compound comprising at least one repeating unit of an aniline compound or a heterocyclic compound and further having a repeating unit of an oxyalkylene group at the linked portion of the repeating unit of said electron conductive moiety and the main chain, and the ethylenical repeating unit is preferably induced from an ethylenical compound represented by the following formula (I) or (II);

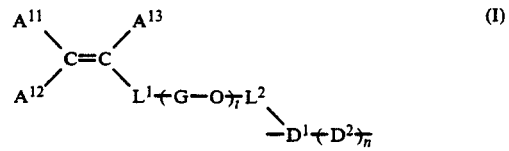

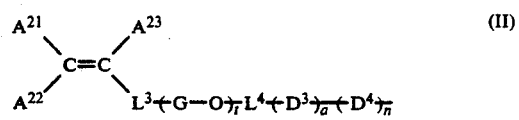

wherein $A^{11}$, $A^{12}$, $A^{13}$, $A^{21}$, $A^{22}$, and $A^{23}$, which may be the same or different, each represents a hydrogen atom or a substituent on the ethylene carbons; $L^1$, $L^2$, $L^3$, and $L^4$, which may be the same or different, each represents a divalent linkage group; $D^1$, $D^2$, $D^3$, and $D^4$, which may be the same or different, each represents an aniline compound or a heterocyclic compound; 1 represents 0 or 1; G represents a substituted or unsubstituted alkylene group; t represents an integer of from 1 to 30, when t is 2 or more plural Gs may be the same or different; and n represents an optional integer (preferably 10 to 1000, more preferably 50 to 500).

Then, formulae (I) and (II) are explained in detail.

Preferred examples of the substituent on the ethylene carbons shown by $A^{11}$, $A^{12}$, $A^{13}$, $A^{21}$, $A^{22}$, and $A^{23}$ include a substituted or unsubstituted alkyl group having from 1 to 4 carbon atoms (e.g., methyl, ethyl, n-propyl, n-butyl, iso-propyl, methoxyethyl, and carboxymethyl), a cyano group, a carboxy group (including alkali metal salts thereof), a carbamoyl group (which may be a substituted or unsubstituted alkyl group having from 1 to 4 carbon atoms or a substituted or unsubstituted phenyl group, e.g., —CONH$_2$, —CON(CH$_3$)$_2$, —CONC$_2$H$_4$OCH$_3$,

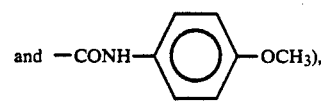

a substituted or unsubstituted alkoxycarbonyl group having from 1 to 4 carbon atoms (e.g., —COOCH$_3$, —COOC$_2$H$_5$,

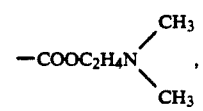

and —COOC$_4$H$_9$(n)), and a halogen atom (e.g., fluorine, chlorine, and bromine).

Particularly preferred examples Of $A^{11}$, $A^{12}$, $A^{13}$, $A^{21}$, $A^{22}$, and $A^{23}$, which may be the same or different, each represents a hydrogen atom, a chlorine atom, a methyl group, or a carboxy group.

The electron conductive moieties, the repeating unit of an oxyalkylene group, and ethylene forming the main chain are each linked with a linkage group shown by $L^1$, $L^2$, $L^3$, or $L^4$.

$L^1$, $L^2$, $L^3$, and $L^4$, which may be the same or different, each is represented by $-(-X^1-)_p-$, $-(-J^1-X^2-)_p-$, $-(-J^2-X^3-)_q-$, $-J^3-$, wherein $J^1$, $J^2$, and $J^3$, which may be the same or different, each represents —O—, —S—, —CO—, —SO$_2$—, —OCO—, —COO—,

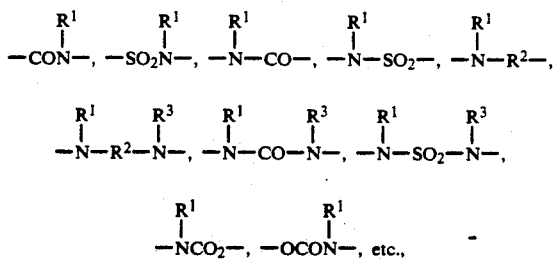

wherein R¹ represents a hydrogen atom, an alkyl group having from 1 to 4 carbon atoms which may be substituted or a phenyl group which may be substituted; R² represents an alkylene group having from 1 to 4 carbon atoms; and R³ represents a hydrogen atom or an alkyl group having from 1 to 6 carbon atoms, which may be substituted.

$J^1$, $J^2$, and $J^3$ each is preferably —CO—, —SO₂—, —CONH—, —SO₂NH—, —NH—CO—, —NH—SO₂—, —O—, —NHCONH—, —S—, —CO₂—, —OCO—, —NHCO₂—, and —OCONH—.

$X^1$, $X^2$, and $X^3$, which may be the same or different, each represents an alkylene group having from 1 to 20 carbon atoms which may be substituted, an arylene group having from 6 to 30 carbon atoms which may be substituted, an aralkylene group having from 6 to 30 carbon atoms which may be substituted, or $(G^1-O-)_{t_1}CH_2CH_2-$ (wherein $G^1$ and $t_1$ have the same meaning as G and t, respectively). $X^1$, $X^2$, and $X^3$ each is preferably an alkylene group having from 1 to 4 carbon atoms, an arylene group having from 6 to 9 carbon atoms, a substituted arylene group, or —(CH₂CH₂)₁₂CH₂CH₂. Also, μ, p, q, r, and s each represents 0 or 1 and $t_2$ has the same meaning as t.

In formulae (I) and (II), the electron conductive moieties shown by $D^1$, $D^2$, $D^3$, and $D^4$, which may be the same or different, each represents an aniline compound or a heterocyclic compound. $D^2$, $D^3$, and $D^4$ are divalent and $D^1$ is trivalent.

Specific examples of the above-described heterocyclic ring are

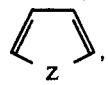

pyrazole, imidazole, tirazole, oxazole (including iso-oxazole), thiazole (including iso-thiazole), pyridine, diazine,

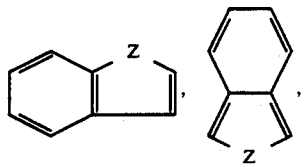

benzodiazole, benzotriazole, benzoxazole, benzothiazole, purine, quinoline, isoquinoline, benzodiazine, fluorene,

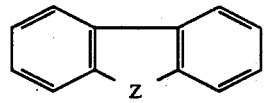

acridine, phenazine, phenoxazine, pyrazotriazole, pyrazolodiazole, pyrazoloazole, and benzopyrazoloazole.

Z represents O, S, or —N—R³ (wherein R³ is the same as described above).

Particularly preferred examples of $D^1$, $D^2$, $D^3$, and $D^4$ are an aniline compound, a pyrrole compound, a thiophene compound and a furan compound.

The aniline compound and the heterocyclic compound shown by $D^1$, $D^2$, $D^3$, and $D^4$ each may be substituted by an optional substituent. Examples of the substituent are a halogen atom, a nitro group, a cyano group, an alkyl group having from 1 to 4 carbon atoms, an alkoxy group having from 1 to 4 carbon atoms, —NHCOR⁴, —NHSO₂R⁴, —SOR⁴, —COR⁴,

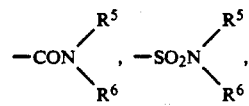

an amino group (which may be further substituted by an alkyl group), a hydroxy group, or a group of forming a hydroxy group by hydrolysis.

R⁴ represents an alkyl group having from 1 to 4 carbon atoms, a phenyl group, or an aralkyl group having from 6 to 9 carbon atoms and R⁵ and R⁶, which may be the same or different, each represents a hydrogen atom, an alkyl group having from 1 to 4 carbon atoms, a phenyl group, or an aralkyl group having from 6 to 9 carbon atoms. Also, two substituents may cause a ring-condensation to form a carbon ring or a heterocyclic ring.

Furthermore, examples of a substituent for an alkyl group, an alkoxy group, a phenyl group, or an aralkyl group in the substituents illustrated in above-described $D^1$, $D^2$, $D^3$, and $D^4$ and in the substituents for $A^{11}$, $A^{12}$, $A^{13}$, $A^{21}$, $A^{22}$, and $A^{23}$, and examples of the substituent for the substituted alkylene group, the substituted arylene group, and the substituted aralkylene group shown by $X^1$, $X^2$, and $X^3$ are a hydroxy group, a nitro group, an alkoxy group having from 1 to 4 carbon atoms, an alkyl group having from 1 to 4 carbon atoms, —NHSO₂R⁷, —NHCR²—,

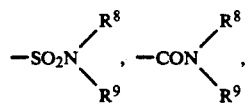

—SO₂R⁷, —COR⁷ (wherein R⁷ has the same meaning as R⁴ and R⁸ and R⁹, which may be the same or different, each has the same meaning as R⁵), a halogen atom, a cyano group, and an amino group (which may be substituted).

Then, specific examples of the aniline compound and the heterocyclic compound shown by $D^1$, $D^2$, $D^3$, and $D^4$ are illustrated below but the invention is not limited to them.

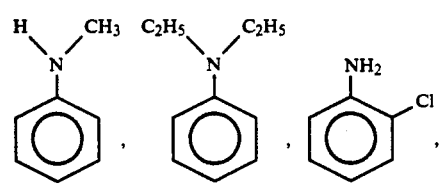
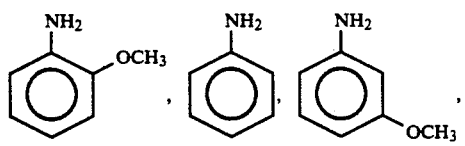
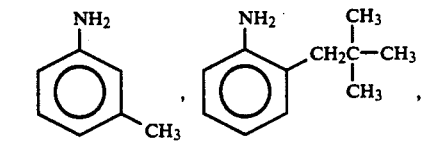
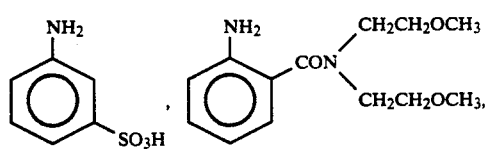
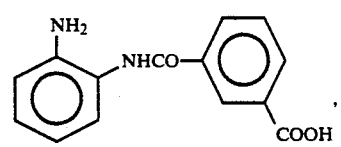
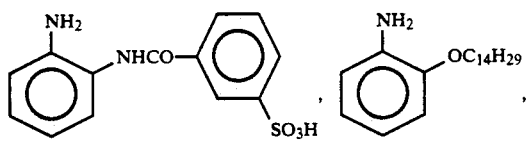
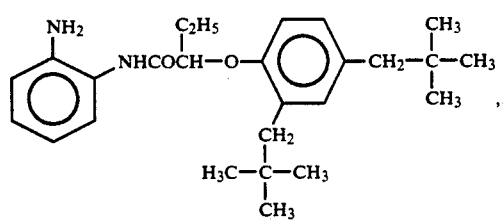
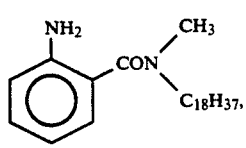
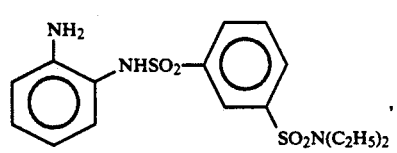
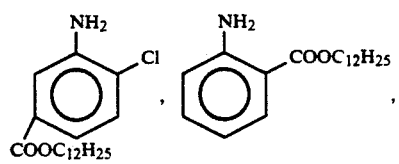
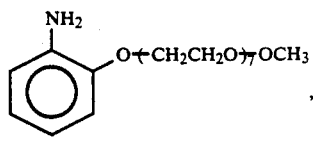
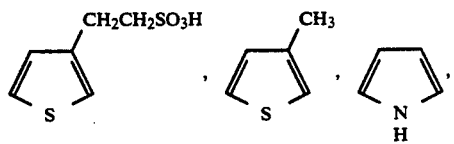
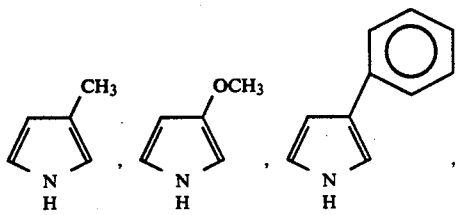
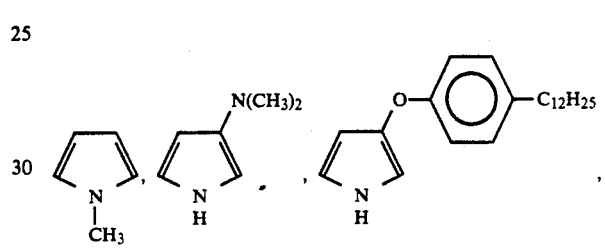
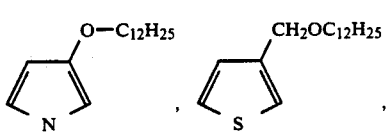
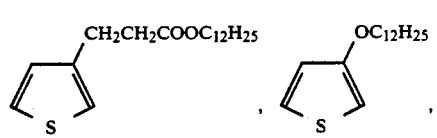
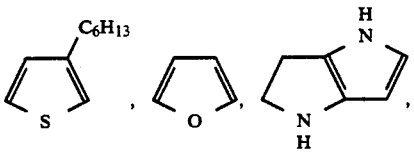
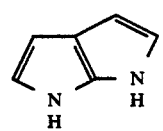
In the above illustrated compounds, preferred ones are aniline, thiophene, and pyrrole.
In formulae (I) and (II) described above, G represents an alkylene group having from 1 to 9 carbon atoms, which may be substituted, and is preferably —CH$_2$CH$_2$—,

and is particularly preferably is —CH$_2$Ch$_2$—.

Also, t represents an integer of from 1 to 30, preferably from 1 to 10, and particularly preferably from 2 to 5.

Then, specific examples of the repeating units (ethylenical compounds) shown by formulae (I) and (II) are illustrated below but the present invention is not limited to them.

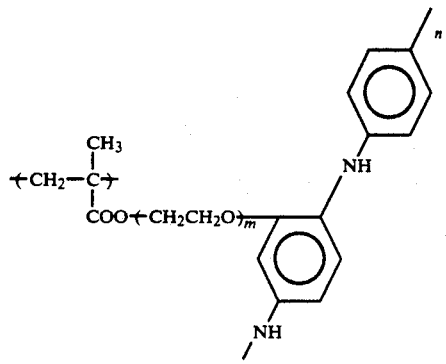

I-1

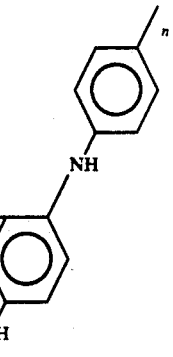

I-2

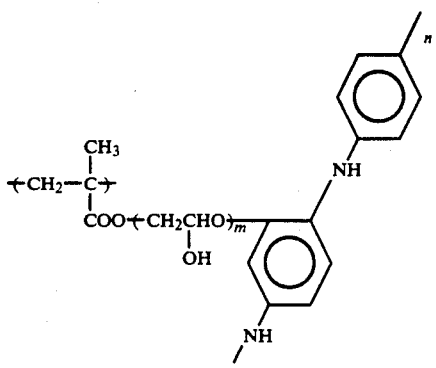

I-3 wherein m represents an optional integer from 1 to 30 (and so on) and n represents an optional integer (and so on).

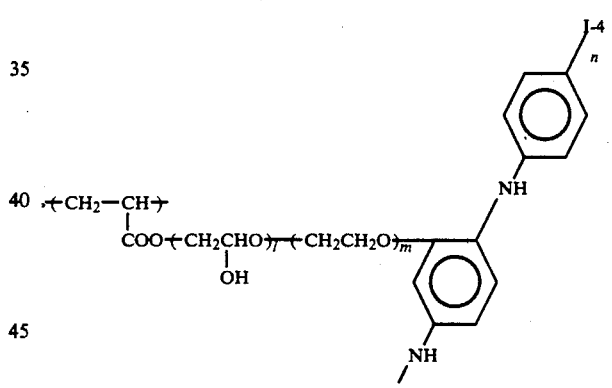

I-4 wherein l represents an optional integer (and so on)

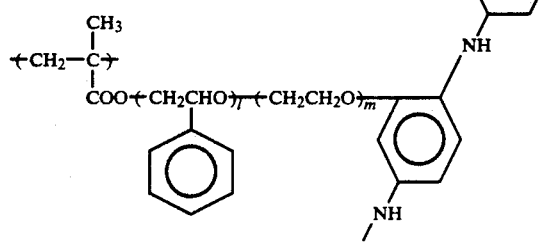

I-5

-continued
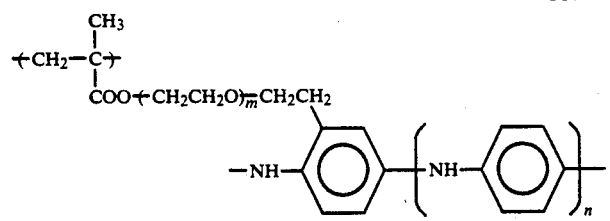
I-6
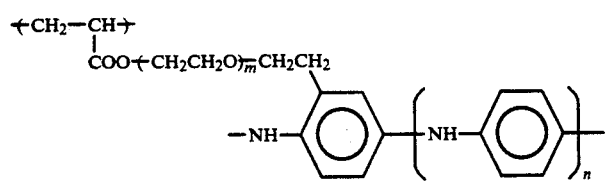
I-7
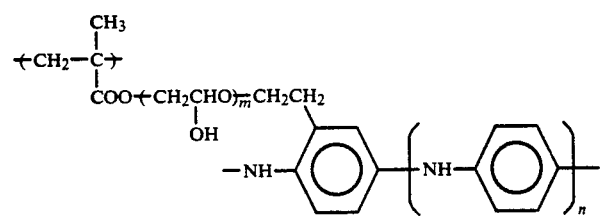
I-8
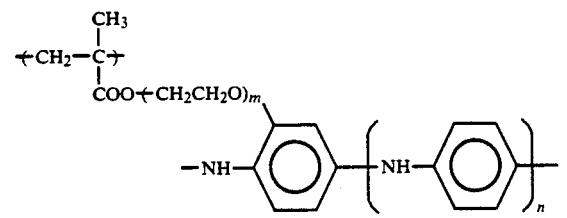
I-9
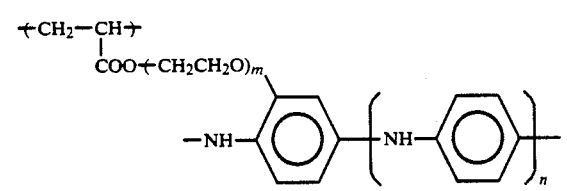
I-10
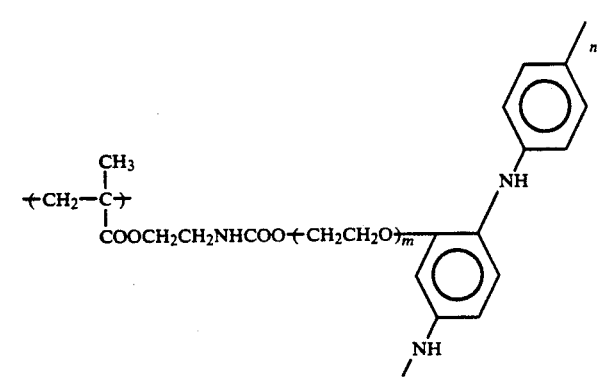
I-11
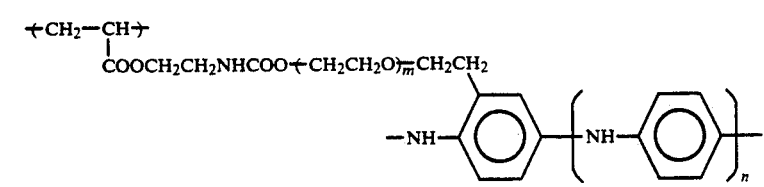
I-12

-continued
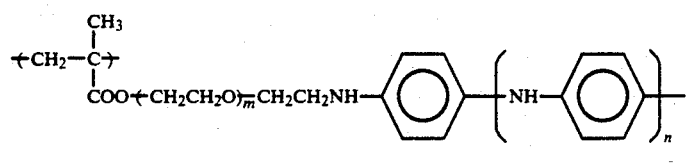
I-13
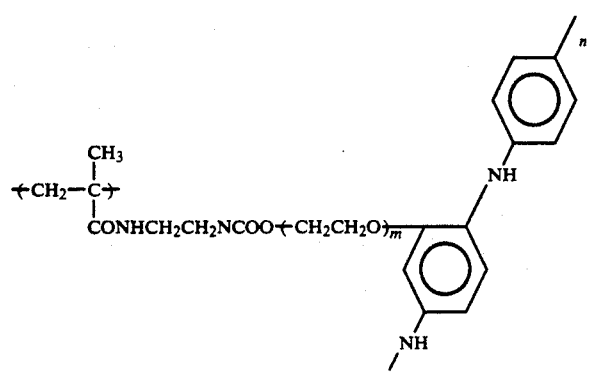
I-14
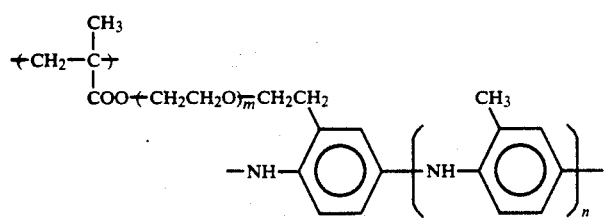
I-15
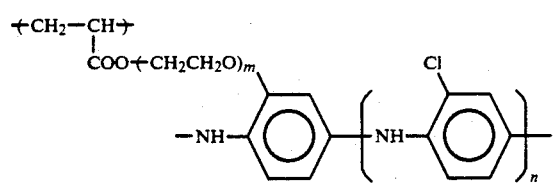
I-16
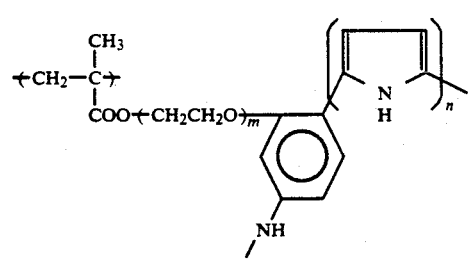
I-17
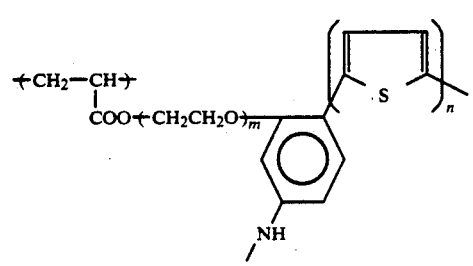
I-18

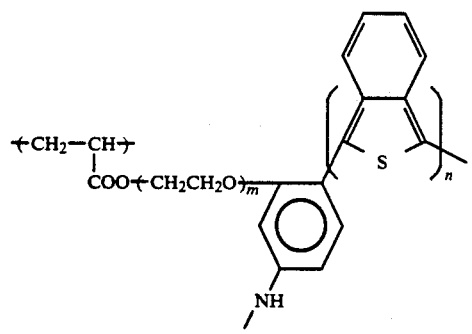
I-19
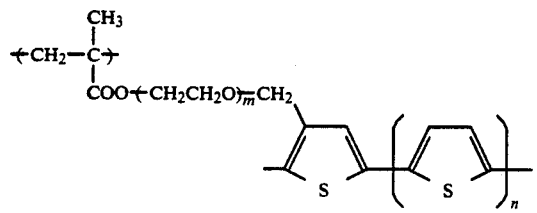
I-20
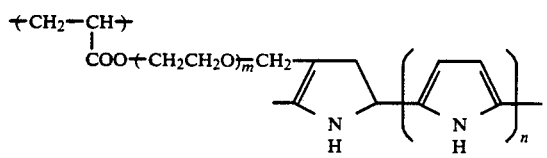
I-21
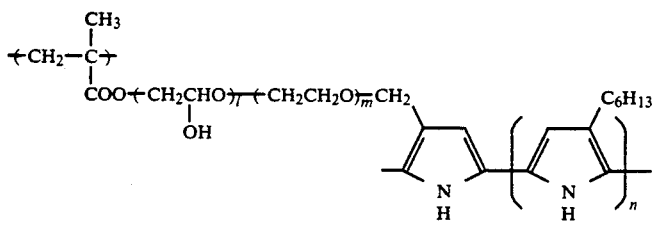
I-22
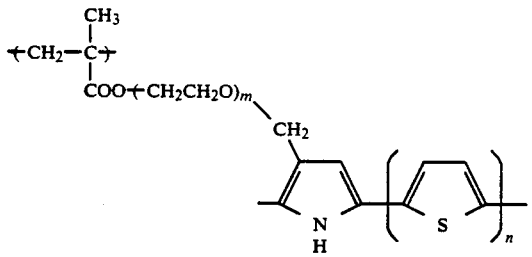
I-23
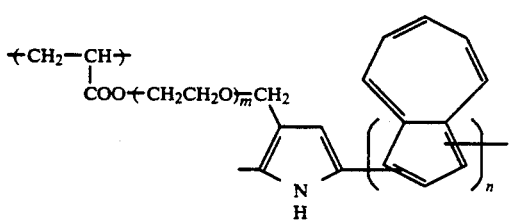
I-24
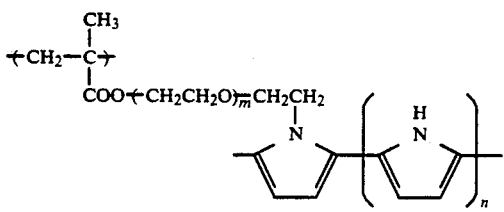
I-25

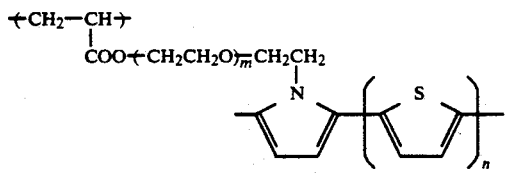

I-26

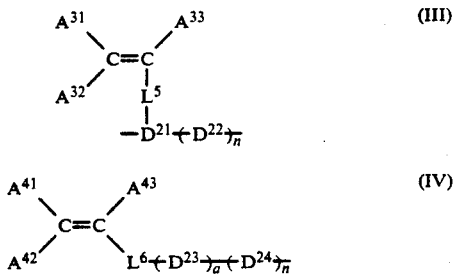

Then, the electron conductive high molecular compound in the 2nd embodiment of the present invention is described in detail.

The electron conductive high molecular compound in this invention comprises an ethylenical repeating unit having at least an electron conductive moiety composed of a compound comprising at least one repeating unit of an aniline compound or a heterocyclic compound at the side chain and an ethylenical repeating unit having a cyclic carbonic acid ester, a cyclic ester, or a cyclic ether at the side chain as described above.

The ethylenical repeating unit having an electron conductive moiety composed of a compound comprising at least one repeating unit of an aniline compound and a heterocyclic compound is preferably induced from an ethylenical compound represented by following formula (III) or (IV);

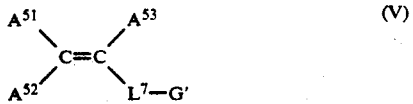

Also, the above-described ethylenical repeating unit having a cyclic carbonic acid ester, a cyclic ester, or a cyclic ether at the side chain is preferably induced from a ethylenical compound shown by following formula (V);

$$\begin{array}{c} A^{51} \\ \diagdown \\ A^{52} \end{array} C=C \begin{array}{c} A^{53} \\ \diagup \\ L^7-G' \end{array} \quad (V)$$

In formulae (III), (IV), and (V), $A^{31}$, $A^{32}$, $A^{33}$, $A^{41}$, $A^{42}$, $A^{43}$, $A^{51}$, $A^{52}$, and $A^{53}$, which may be the same or different, each represents a hydrogen atom or a substituent on the ethylene carbon; $L^5$, $L^6$, and $L^7$, which may be the same or different, each represents a divalent linkage group; $D^{21}$, $D^{22}$, $D^{23}$, and $D^{24}$, which may be the same or different, each represents an aniline compound or a heterocyclic compound; a represents 0 or 1; G' represents a substituted or unsubstituted cyclic carbonic acid ester, a substituted or unsubstituted cyclic ester, or a substituted or unsubstituted cyclic ether; n represents an optional integer (preferably 10 to 1000, more preferably 50 to 500).

Then, formulae (III), (IV), and (V) are described in detail.

Preferred examples of the substituent on the ehtylene carbon shown by $A^{31}$, $A^{32}$, $A^{33}$, $A^{41}$, $A^{42}$, $A^{43}$, $A^{51}$, $A^{52}$, and $A^{53}$ are an alkyl group having from 1 to 4 carbon atoms, which may be substituted, (e.g., methyl, ethyl, n-propyl, n-butyl, iso-propyl, methoxyethyl, and carboxymethyl), a cyano group, a carboxy group (including alkali metal salts), a carbamoyl group (which may be substituted by a substituted or unsubstituted alkyl group having from 1 to 4 carbon atoms or a substituted or unsubstituted phenyl group, e.g., —CONH$_2$, —CON(CH$_3$)$_2$, —CONC$_2$H$_4$OCH$_3$, and

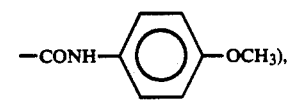

a substituted or unsubstituted alkoxycarbonyl group having from 1 to 4 carbon atoms (e.g., —COOCH$_3$, —COOC$_2$H$_5$,

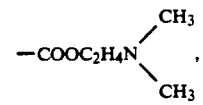

and —COOC$_4$H$_9$(n)), and a halogen atom (e.g., fluorine, chlorine, and bromine).

Particularly preferred examples of $A^{31}$, $A^{32}$, $A^{33}$, $A^{41}$, $A^{42}$, $A^{43}$, $A^{51}$, $A^{52}$, and $A^{53}$, which may be the same or different, each represents a hydrogen atom, a chlorine atom, a methyl group, or a carboxy group.

The electron conductive moiety, the cyclic carbonic acid ester, a cyclic ester or cyclic ether is linked to the ethylene forming the main chain by a linkage group shown by $L^5$, $L^6$, or $L^7$ as shown in formula (III), (IV) or (V).

$L^5$, $L^6$, and $L^7$, which may be the same or different, each is represented by $[(X^{1'})_{82'}(J^{1'}\text{-}X^{2'})_{p'}(J^{2'}\text{-}X^{3'})_{q'}(J^{3'})_{r'}]_{s'}$, (wherein $J^{1'}$, $J^{2'}$, and $J^{3'}$, which may be the same or different, each represents —O—, —S—, —CO—, —SO$_2$—, —OCO—, —COO—,

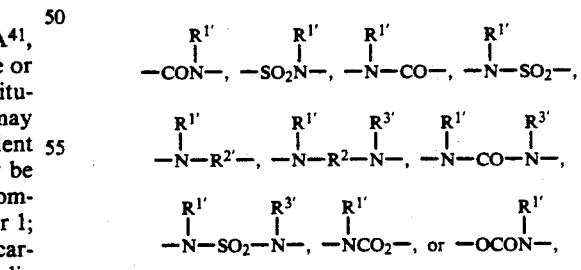

wherein $R^{1'}$ represents a hydrogen atom, a substituted alkyl group or a substituted or unsubstituted phenyl group; $R^{2'}$ represents an alkylene group having from 1 to 4 carbon atoms; $R^{3'}$ represents a hydrogen atom or an alkyl group having from 1 to 6 carbon atoms, which may be substituted; $J^{1'}$, $J^{2'}$, and $J^{3'}$ each preferably represents —CO—, —SO$_2$—, —CONH—, —SO$_2$NH—, —NH—CO—, —NH—SO$_2$—, —O—, —NHCONH—, —S—, —CO$_2$—, —OCO—, —NHCO$_2$—, or —OCONH—; X¹′, X²′, and X³′, which may be the same or different, each represents a substituted or unsubstituted alkylene group, a substituted or unsubstituted arylene group, a substituted or unsubstituted aralkylene group, or —CH₂CH₂—O—₍CH₂CH₂— (wherein t represents an integer of from 1 to 30); said X¹′, X²′, and X³′ each preferably represents an alkylene group having from 1 to 4 carbon atoms, an arylene group having from 6 to 9 carbon atoms, a substituted arylene group, or —CH₂CH₂O)₍CH₂CH₂—; and μ′, p′, q′, r′, and s′ each represents 0 or 1.

In formulae (III) and (IV) described above, the electron conductive moiety shown by D¹, D²², D²³, and D²⁴, which may be the same or different, each represents an aniline compound or a heterocyclic compound. D²², D²³, and D²⁴ each is a divalent compound and D²¹ is trivalent compound.

Specific examples of the preferred heterocyclic compound described above are

pyrazole, imidazole, tirazole, oxazole (including iso-oxazole), thiazole (including iso-thiazole), pyridine, diazine,

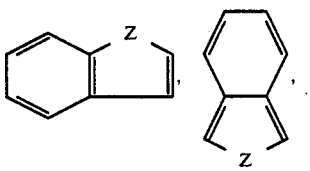

benzodiazole, benzotriazole, benzoxazole, benzothiazole, purine, quinoline, isoquinoline, benzodiazine, fluorene,

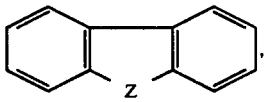

acridine, phenazine, phenoxazine, pyrazotriazole, pyrazolodiazole, pyrazoloazole, and benzopyrazoloazole.

In the above formulae, Z represents O, S, or —N—R³′ (wherein R³′ has the same meaning as described above).

Particularly preferred examples of D²¹, D²², D²³, and D²⁴ are an aniline compound, a pyrrole compound, a thiophene compound, and a furan compound.

The aniline compound or the heterocyclic compound shown by D²¹, D²², D²³, and D²⁴ and the group shown by G′ each may be substituted by an optional substituent such as, for example, a halogen atom, a nitro group, a cyano group, an alkyl group, an alkoxy group, —NHCOR⁴′, —NHSO₂R⁴′, —SOR⁴′, —SO₂R⁴′, —COR⁴′,

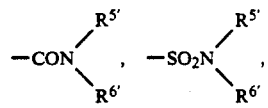

an amino group (which may be further substituted by an alkyl group), a hydroxy group, and a group forming a hydroxy group by causing a hydrolysis (wherein R⁴′ represents an alkyl group, a phenyl group, or an aralkyl group and R⁵′ and R⁶′, which may be the same or different, each represents a hydrogen atom, an alkyl group, a phenyl group, or an aralkyl group, and above two substituents may cause a ring-condensation to form a carbon ring or a heterocyclic ring.

Furthermore, examples of substituents for the alkyl group, alkoxy group, phenyl group, or aralkyl group in the substituents illustrated above on D²¹, D²², D²³, D²⁴ and G′ and in the substituents for A³¹, A³², A³³, A⁴¹, A⁴², A⁴³, A⁵¹, A⁵², and A⁵³, and examples of the substituent for the substituted alkylene group, the substituted arylene group, and the substituted aralkylene group shown by X¹′, X²′, or X³′ are a hydroxy group, a nitro group, an alkoxy group having from 1 to 4 carbon atoms, an alkyl group having from 1 to 4 carbon atoms, —NHSO₂R⁷′, —NHCR⁷′,

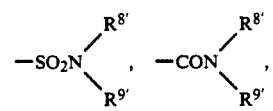

SO₂R⁷′, —COR⁷′, a halogen atom, a cyano group, and an amino group (which may be further substituted by an alkyl group).

R⁷′ has the same meaning as R⁴′ and R⁸′ and R⁹′, which may be the same or different, each has the same meaning as R⁵′.

Specific examples of the aniline compound or the heterocyclic compound shown by D²¹, D²², D²³, and D²⁴ are same as those illustrated hereinbefore as the examples of the aniline compound and the heterocyclic compound shown by D¹, D², D³, and D⁴ in the 1st embodiment of the present invention.

Preferred examples of the aniline compound and the heterocyclic compound are aniline, thiophene, and pyrrole.

G′ in formula (V) described above represents a substituted or unsubstituted cyclic carbonic acid ester, a substituted or unsubstituted cyclic ester, or a substituted or unsubstituted cyclic ether.

Preferred examples of G′ are ethylene carbonate, vinylene carbonate, 1,3-dioxan-2-one, γ-butyllactone, γ-valerolactone, γ-caprylactone, γ-caprolactone, crotolactone, δ-valerolactone, tetrahydrofuran, tetrahydropyran, dioxolan, 1,3-dioxane, and 1,4-dioxane.

Also, t represents an integer of from 1 to 30, preferably from 1 to 10, and particularly preferably from 2 to 5.

Then specific examples of the repeating units shown by formula (III) and (IV) are illustrated below, but as a matter of course, the invention is not limited to them.

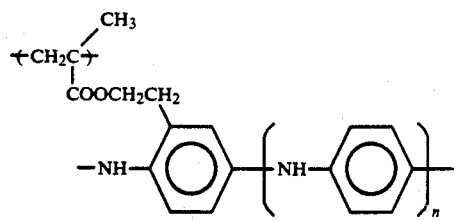 III-1
n represents an optional integer (and so on)
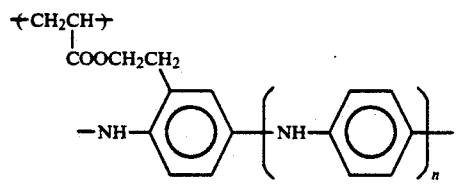 III-2
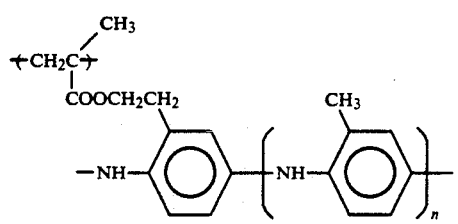 III-3
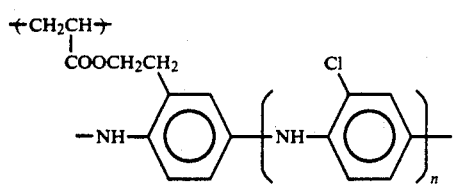 III-4
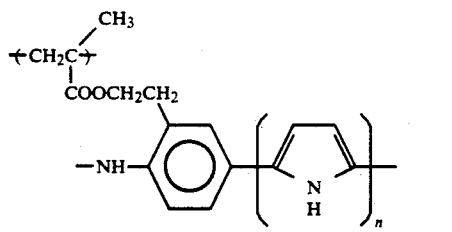 III-5
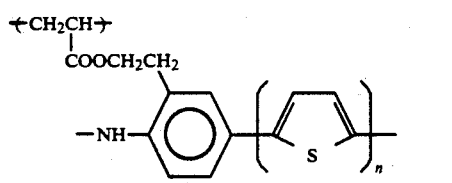 III-6
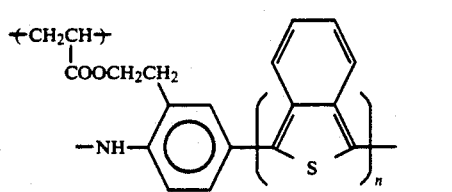 III-7

-continued
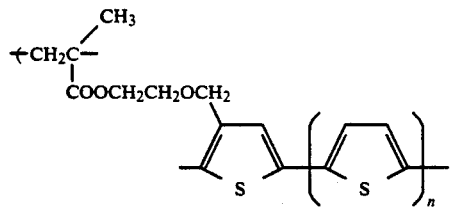
III-8
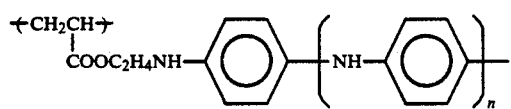
III-9
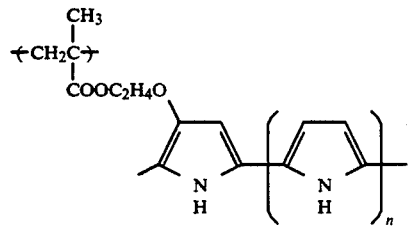
III-10
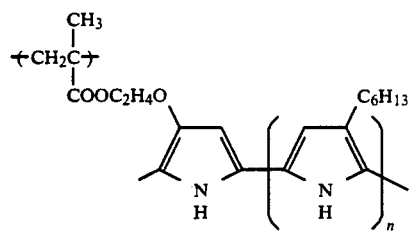
III-11
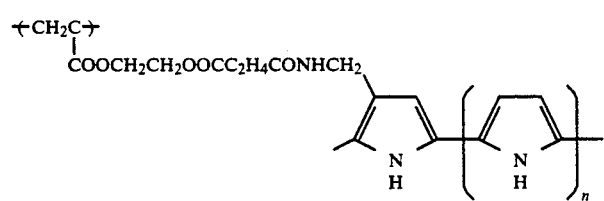
III-12
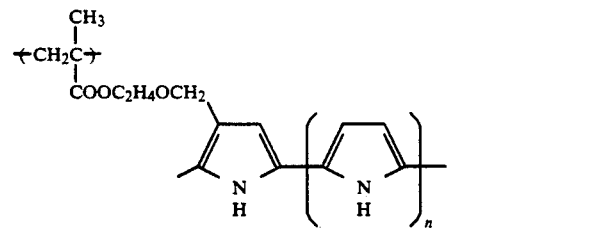
III-13
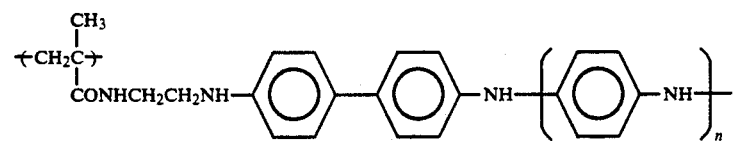
III-14
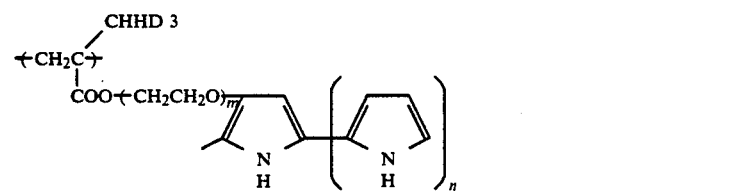
III-15
m represents an optional integer of 1 to 30 (and so on)

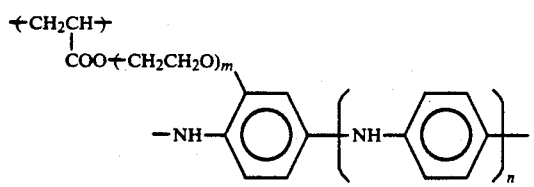	III-16
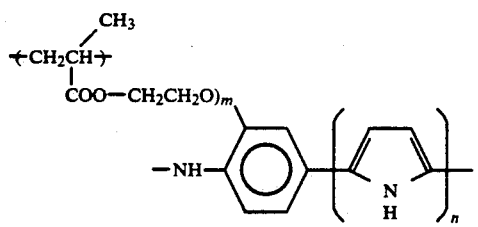	III-17
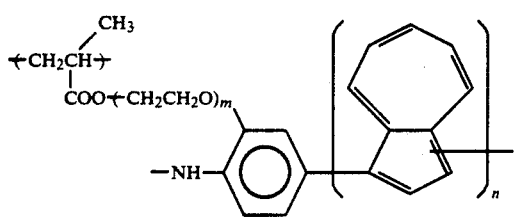	III-18
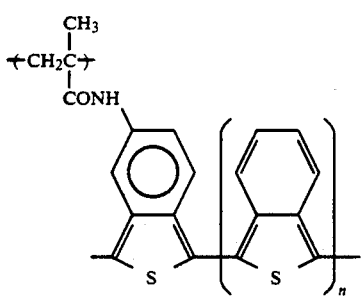	III-19
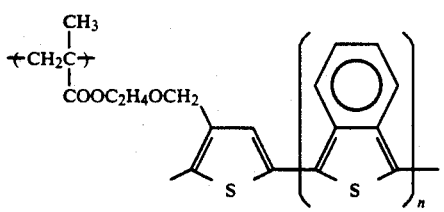	III-20
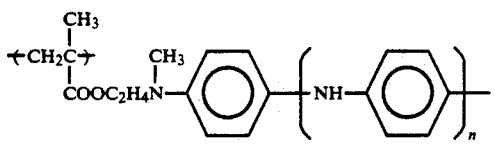	III-21
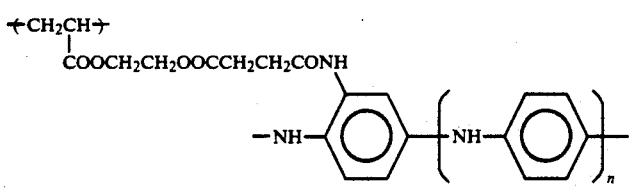	III-22

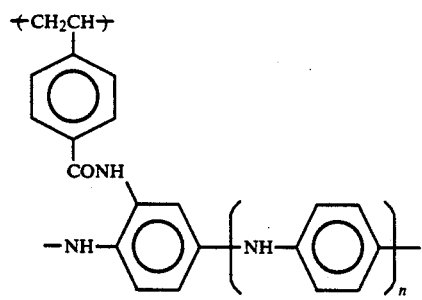
III-23
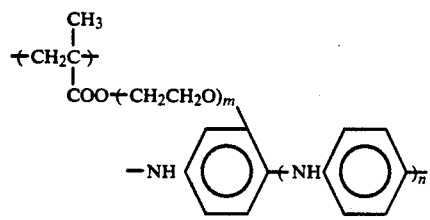
III-24
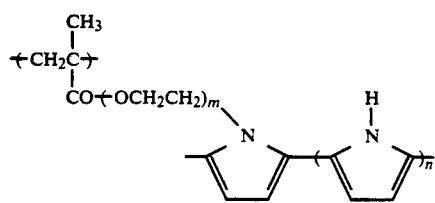
III-25
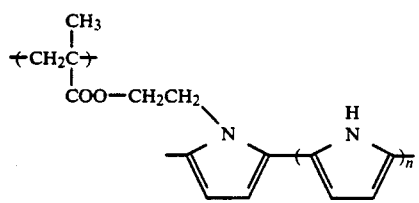
III-26
Then, the specific examples of the repeating unit represented by formula (V) described above are illustrated below but the invention is not limited to them.
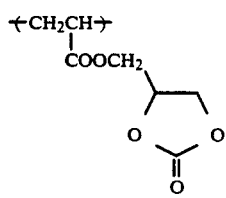
V-1
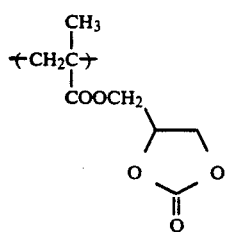
V-2
-continued
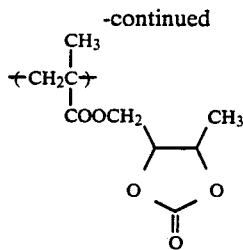
V-3
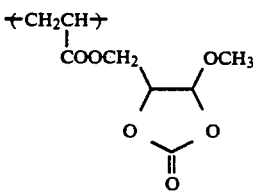
V-4
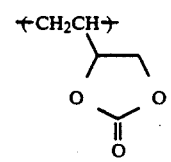
V-5

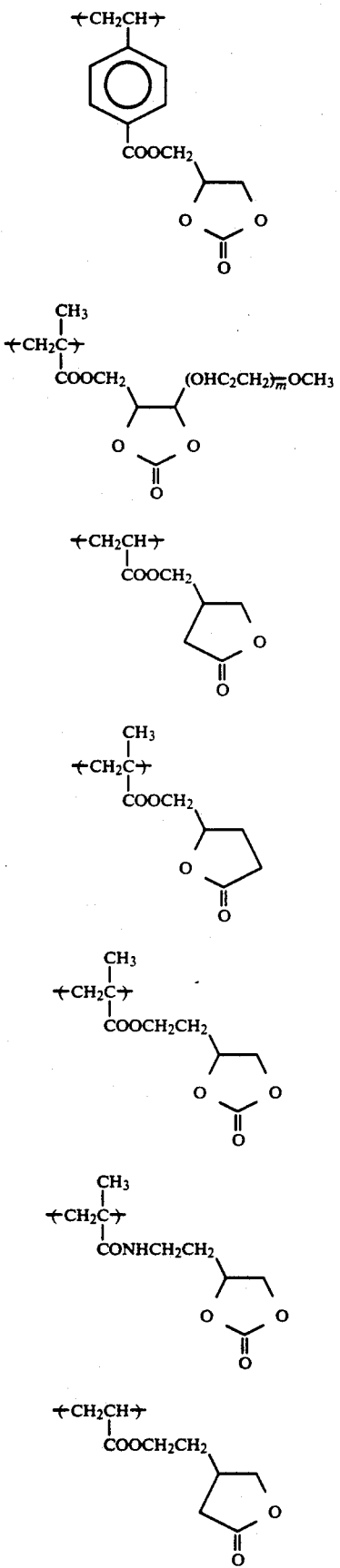

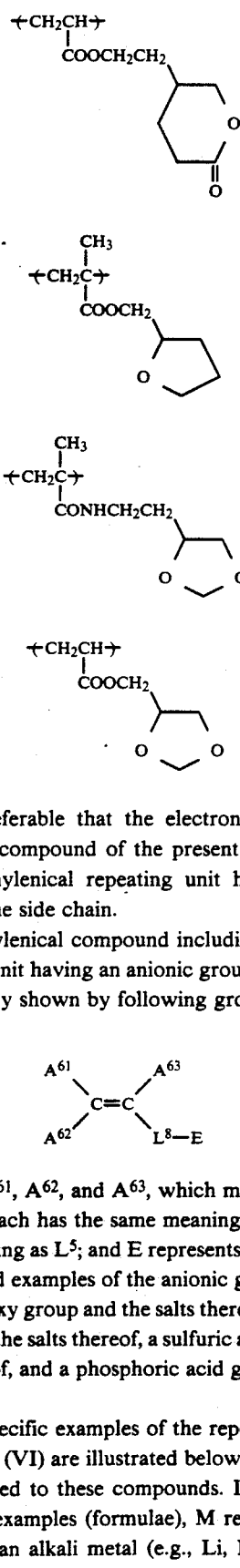

It is preferable that the electron conductive high molecular compound of the present invention further has an ethylenical repeating unit having an anionic group at the side chain.

The ethylenical compound including the ethylenical repeating unit having an anionic group at the side chain is preferably shown by following group (VI);

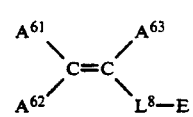

wherein $A^{61}$, $A^{62}$, and $A^{63}$, which may be the same or different, each has the same meaning as $A^1$; $L^8$ has the same meaning as $L^5$; and E represents an anionic group.

Preferred examples of the anionic group shown by E are a carboxy group and the salts thereof, a sulfonic acid group and the salts thereof, a sulfuric acid group and the salts thereof, and a phosphoric acid group and the salts thereof.

Then, specific examples of the repeating unit shown by formula (VI) are illustrated below but the invention is not limited to these compounds. In addition, in the following examples (formulae), M represents a hydrogen atom, an alkali metal (e.g., Li, Na, and K) or an alkaline earth metal (e.g., Mg and Ca).

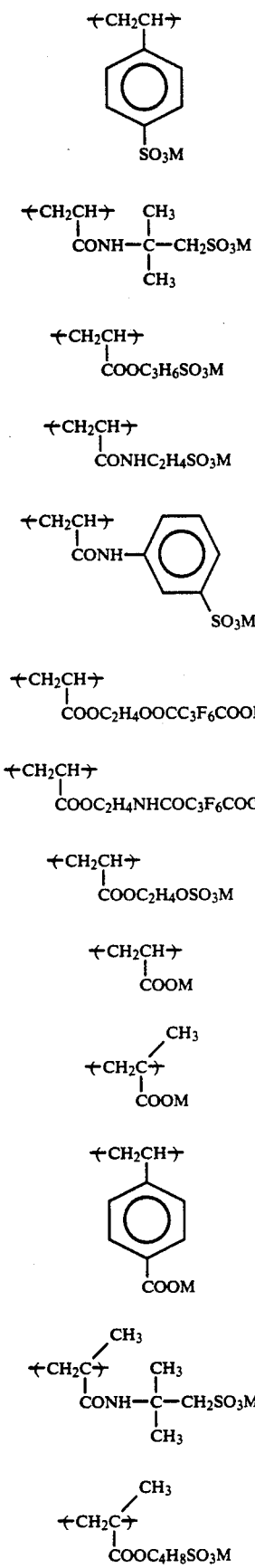

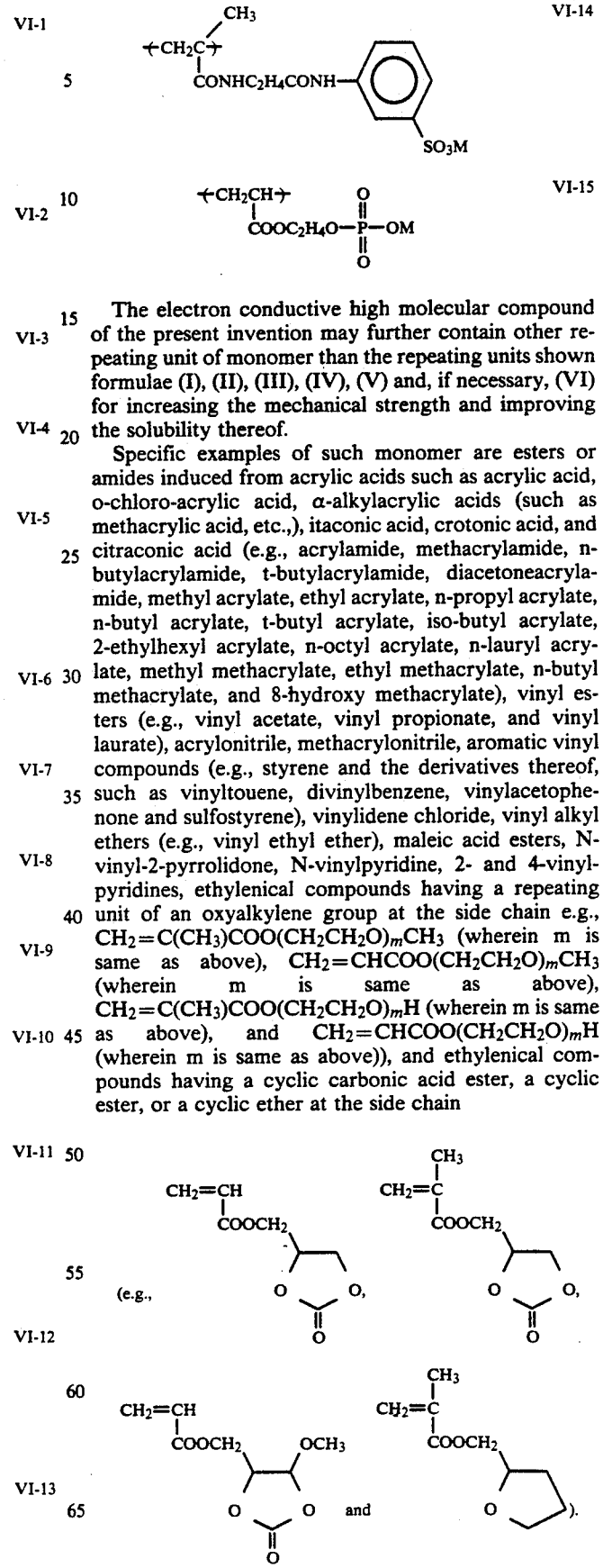

The electron conductive high molecular compound of the present invention may further contain other repeating unit of monomer than the repeating units shown formulae (I), (II), (III), (IV), (V) and, if necessary, (VI) for increasing the mechanical strength and improving the solubility thereof.

Specific examples of such monomer are esters or amides induced from acrylic acids such as acrylic acid, o-chloro-acrylic acid, α-alkylacrylic acids (such as methacrylic acid, etc.,), itaconic acid, crotonic acid, and citraconic acid (e.g., acrylamide, methacrylamide, n-butylacrylamide, t-butylacrylamide, diacetoneacrylamide, methyl acrylate, ethyl acrylate, n-propyl acrylate, n-butyl acrylate, t-butyl acrylate, iso-butyl acrylate, 2-ethylhexyl acrylate, n-octyl acrylate, n-lauryl acrylate, methyl methacrylate, ethyl methacrylate, n-butyl methacrylate, and 8-hydroxy methacrylate), vinyl esters (e.g., vinyl acetate, vinyl propionate, and vinyl laurate), acrylonitrile, methacrylonitrile, aromatic vinyl compounds (e.g., styrene and the derivatives thereof, such as vinyltouene, divinylbenzene, vinylacetophenone and sulfostyrene), vinylidene chloride, vinyl alkyl ethers (e.g., vinyl ethyl ether), maleic acid esters, N-vinyl-2-pyrrolidone, N-vinylpyridine, 2- and 4-vinylpyridines, ethylenical compounds having a repeating unit of an oxyalkylene group at the side chain e.g., $CH_2=C(CH_3)COO(CH_2CH_2O)_mCH_3$ (wherein m is same as above), $CH_2=CHCOO(CH_2CH_2O)_mCH_3$ (wherein m is same as above), $CH_2=C(CH_3)COO(CH_2CH_2O)_mH$ (wherein m is same as above), and $CH_2=CHCOO(CH_2CH_2O)_mH$ (wherein m is same as above)), and ethylenical compounds having a cyclic carbonic acid ester, a cyclic ester, or a cyclic ether at the side chain Also, the electron conductive high molecular compound in the 1st embodiment of the present invention may further contain, if desired, an ethylenical compound having an electron conductive moiety as a repeating unit at the side chain and having no repeating unit of an oxyalkylene group at the linked portion in addition to the repeating units shown by above-described formulae (I), (II), and, if desired, (VI) for improving the mechanical strength and the solubility of the polymer (or the high molecular compound). Specific examples of the above-described etylenical compound which can be used as an additional monomer in the 1st embodiment of the present invention are those illustrated hereinbefore as the specific examples of the repeating units shown by formulae (III) and (IV), which are used in the 2nd embodiment of the present invention.

Now, in the 1st embodiment of the present invention, the ethylenical repeating unit having the electron conductive moiety as a repeating unit at the side chain and the repeating unit of an oxyalkylene group at the linked portion of the repeating unit of the electron conductive moiety and the main chain may be contained in the polymer (the electron conductive high molecular compound) at an optional content but the content thereof is preferably from 1 to 50 mol%, and particularly preferably from 1 to 20 mol%.

As described above, it is preferred that the electron conductive high molecular compound of the present invention contains an ethylenical repeating unit having an anionic group at the side chain. Such an ethylenical repeating unit may be contained in the polymer at an optional content but a preferred content is from 5 to 80 mol%.

The ethylenical repeating unit having an electron conductive moiety at the side chain in the 2nd embodiment of the present invention may be contained in the polymer at an optional content but a preferred content thereof is 1 to 20 mol%.

Also, the ethylenical repeating unit having a cyclic carbonic acid ester, a cyclic ester, or a cyclic ether at the side chain in the 2nd embodiment of the present invention may be contained in the polymer at an optional content but a preferred content thereof is from 5 to 99 mol%.

The electron conductive high molecular compound of the present invention can be synthesized by a generally known synthesis method such as a known polymerization method, a chemically oxidation polymerization method, an electrolytic oxidation polymerization method, a C—C coupling reaction, etc.

For example, the compound of this invention can be obtained by performing a polymerization of the main chain such that the polymer has an electron conductive moiety at the side chain and thereafter performing the polymerization of the electron conductive moiety by a chemical oxidation polymerization method, and electrolytic oxidation polymerization method, a C—C coupling reaction, etc. In this case, the polymerization may be carried out at different conductive moieties. Also, after carrying out the polymerization of the electron conductive moiety by a chemical oxidative polymerization, an electrolytic oxidation polymerization, a C—C coupling reaction, etc., a side chain having a repeating unit of the electron conductive moiety may be introduced therein by a high molecular reaction. Furthermore, the polymerization of the main chain may be carried out using a premonomer obtained by the polymerization of the electron conductive moiety by a chemical oxidation polymerization method, an electrolytic oxidation polymerization method, a C—C coupling reaction, etc. In this case, the premonomer obtained by the polymerization of the electron conductive moiety may be homopolymerized or copolymerized with other optional monomer.

The above-described chemical oxidation polymerization method is carried out by dissolving or dispersing a monomer compound in water or an optional organic solvent (which may contain water) and then slowly adding dropwise a catalyst (oxidizing agent) to the solution or dispersion at a temperature of from 60° C. to −20° C., and preferably from 20° C. to 0° C. In this case, it is preferred to use a proper dispersing agent or a surface active agent, since an aqueous dispersion of polymer can be obtained to provide a polymer having excellent molding workability.

The above-described electrolytic oxidation polymerization method is carried out by dissolving or dispersing a monomer compound and an electrically conductive salt in water or an organic solvent capable of dissolving the conductive salt, immersing an anode and a cathode in the solution or dispersion, and applying a constant voltage method, a constant potential method or a constant electric current method at 80° C. to −20° C. (preferably 30° C. to 0° C.). In this case, a constant voltage method is preferred.

The above-described C—C coupling reaction is mainly applied to a thiophene series compound (it may be also applied to an aniline series compound or a pyrrole series compound) and the desired compound can be obtained by reacting a halogenated thiophene series compound with a Grignard reagent or a metal halide. Practically, the method is described in Synthesis Metal, 26, 267(1988). Also, the compound of the present invention may be doped by an optional dopant (e.g., a halogen or a salt being used at the above-described polymerization).

As a catalyst which can be used for the chemical oxidation polymerization method, chlorides such as ferric chloride, cupric chloride, etc., sulfates such as ferric sulfate, cupric sulfate, etc., metal oxides such as lead dioxide, manganese dioxide, etc., peroxides such as potassium persulfate, ammonium persulfate, hydrogen proxide, etc., quinones such as benzoquinone, etc., halogens such as iodine, bromine, etc., and potassium ferricyanide can be used. Practical examples of the catalyst are described in JP-A-63-213518, JP-A-63-193926, JP-A-62-116665, JP-A-62-104832, JP-A-63-215717, JP-A-63-69823, JP-A-63-101415, and JP-A-60-58430.

The amount of the catalyst depends upon the properties of the monomer(s) and the kind of the catalyst but the ratio of catalyst/monomer is usually in the range of from 0.01 to 10.

As the electrode materials which can be used for the electrolytic oxidation polymerization method, there are metal electrodes (e.g., Au, Pt, Ni, Cu, Sn, Zn, Ag, Ru, and stainless steel), carbon electrodes (e.g., glassy carbon), and metal oxide-containing electrodes (e.g., $SnO_2$ and $In_2O_3$). Also, in this case, it is preferred to use a reference electrode.

As a solvent which can be used for the chemical oxidation polymerization method, there are organic solvents (e.g., acetonitrile, dimethyl sulfate, N,N-dimethylacetamide, N,N-dimethylformamide, dimethyl sulfoxide, sulfolan, formamide, dimethoxyethane, propylene carbonate, dioxane, methanol, ethanol, γ-butyrolactone, nitrobenzene, tetrahydrofuran, and nitromethane), water, and a mixture of them.

Also, at the chemical oxidation polymerization method or the electrolytic oxidation polymerization method, an electrolytically conductive compound may be added to the polymerization system.

As the electrically conductive material, there are inorganic acids (e.g., HCl, $H_2SO_4$, $HClO_4$, and $HBF_4$), organic acids (e.g., sulfonic acid such as toluenesulfonic acid, trifluoromethylsulfonic acid, and polystyrenesulfonic acid and carboxylic acid such as formic acid, acetic acid, and polyacrylic acid), organic bases (e.g., pyridine and triethanolamine), electrically conductive salts (alkali metal cations ($Li^+$, $Na^+$, and $K^+$), $NO^+$, and $NO_2^+$), salts composed of onium cations (e.g., $Et_4N^+$, $Bu_4N^+$, and $Bu_3P^+$) and anions (e.g., $BF_4^-$, $AsF_4^-$, $AsF_6^-$, $SbF_6^-$, $SbCl_6^-$, $PF_6^-$, $ClO_4^-$, $AlF_4^-$, $AlF_6^-$, $NiF_4^{2-}$, $ZrF_6^{2-}$, $TiF_6^{2-}$, $B_{10}Cl_{10}^{2-}$, $HSO_4^-$, $SO_4^{2-}$, $Cl^-$, $Br^-$, $F^-$, and $I^-$), salts containing sulfonic acid anions (e.g., $CH_3C_6H_4SO_3^-$, $C_6H_5SO_3^-$, $CF_3SO_3^-$, and polystyrenesulfonic acid), salts containing carboxylic acid anions such as HCOOLi, sodium polyacrylate, etc., chlorides such as $FeCl_3$, and organic amine salts such as pyridine hydrochloride.

As a dispersing agent, cationic, anionic, nonionic polymers, betaines, and surface active agents (emulsifying agents) can be used.

Practical examples of the dispersing agent are polyvinyl alcohol, polyethylene oxide, polypropylene oxide, hydroxyethyl cellulose, carboxymethyl cellulose, methyl cellulose, dextrin, polyvinylpyrrolidone, sodium polystyrenesulfonate, polyacrylic acid, polyacrylamide, gelatin, collagen, a polymer having a tertiary or quaternary ammonium salt site, a polymer having an oxonium salt site, a polymer having a sulfonium salt site, a long chin alkyl compound having a quaternary ammonium salt site, higher fatty acid alkali salts (e.g., $C_{11}H_{23}COONa$), alkyl sulfates (e.g., sodium laurylsulfonate), alkylarylsulfonates (e.g., sodium dodecylbenzenesulfonate), sulfosuccinic acid ester salts, higher amine halogenates, halogenated alkylpyridiniums (e.g., dodecylpyridinium chloride), quaternary ammonium salts (e.g., trimethylammonium chloride), polyethylene glycol alkyl ethers, polyethylene glycol fatty acid esters, sorbitan fatty acid esters, fatty acid monoglyceride, and amino acids.

In the case of using a dispersing agent, the content thereof is from 1 to 300% by weight, and preferably from 5 to 200% by weight based on the weight of the monomer.

Also, in the case of using a surface active agent, the content thereof is from 0.01 to 50% by weight, and preferably from 0.1 to 20% by weight based on the weight of the monomer.

The aqueous dispersion may be subjected to a dialysis treatment, a ultrafiltration treatment, etc.

To the aqueous dispersion may be added the above-described electrically conductive compound or the aqueous dispersion may be blended with a high molecular compound such as polyvinyl acetate, etc.

The electron conductive high molecular compound of this invention can be used as an electrically conductive material for a polymer battery by laminating with a high molecular solid electrolyte. The electron conductive high molecular compound of the present invention may form plural layers or may form plural layers with a known electron conductive high molecular compound. Also, the electron conductive high molecular compound of the present invention may form laminate layers with a salt of a metal belonging to group Ia or IIa of the periodic table. However, it is preferable that the electron conductive high molecular compound of the present invention is in direct contact with a high molecular solid electrolyte.

As a high molecular solid electrolyte forming a laminate layer type conductive material with the electron conductive high molecular compound of this invention, there are cationic polymers, anionic polymers, polyacrylonitrile, polyalkylene oxide polymers (e.g., polyethylene oxide (PEO), polypropylene oxide (PPO), a silicon compound containing PEO, and phosphazene), and a combination of polyvinyl alcohol etc., and a salt.

Practical examples of the high molecular solid electrlyte are described in JP-A-61-256573, JP-A-61-124001, JP-A-62-20263, JP-A-62-139266, JP-A-63-241066, JP-A-63-241026, JP-A-63-135477, JP-A-63-142061, JP-A-63-130613, JP-A-60-23974, JP-A-63-136409, JP-A-63-193954, JP-A-63-186766, and JP-A-63-205364, U.S. Pat. No. 4,822,701, and *Macromolecules*, Vol. 21, page 648.

As the salt of constituting the high molecular solid electrolyte, there are electrically conductive salts which are used at the polymerization in the chemical oxidation polymerization method or the electrolytic oxidation polymerization method described above. Salts of metals belonging to group Ia or IIa of the periodic table are preferable and a Li salt is more preferable.

The laminate layer type electric conductive material of the present invention can be prepared, when the electron conductive high molecular compound obtained by a chemical oxidation polymerization method is a powder or massive materials, by forming the film of the electron conductive high molecular material by compression molding and laminating the film with a film of a high molecular solid electrolyte under pressure. Also, when the electron conductive high molecular compound obtained is an aqueous dispersion, the laminate layer type conductive material can be obtained by a known coating method such as a roller coating method, a spin coating method, a hopper coating method, a dip coating method, a spray coating method, an extrusion molding coating method, etc., and a known drying method.

Also, a dissolved or melted high molecular solid electrolyte may be closely layered by coating, etc., on the film of the electron conductive high molecular compound formed on an electrode by an electrolytic oxidation polymerization method or the film of the electron conductive high molecular compound formed by the above-described means, etc.

Furthermore, by imparting the function of a high molecular solid electrolyte to the electron conductive high molecular compound of this invention, it is possible that the use of an electrolyte layer is substantially unnecessary.

That is, by only using a separator between a positive electrode (the electron conductive high molecular compound of this invention) and a negative electrode, a function as a battery can be obtained.

The above-described laminated layer type conductive material may be prepared by laminating each component after preparing the components independently or may be prepared by coating the positive electrode material on a separator and then laminating a negative electrode.

In this case, it is preferred that the separator is previously impregnated with an optional organic solvent (e.g., propylene carbonate, ethylene carbonate, γ-butyro-lactone, dimethoxyethane, and methyl tetrahydrofuran), whereby the ion (e.g., Li+) of the negative electrode material is liable to diffuse therein.

The above-described organic solvent may contain a lithium salt.

As a separator material, polyolefin, polyester, polyvinyl chloride, a fluorine resin, polyamide, polysulfon, a cellulose, polyurethane, etc., can be used. Also, these materials may be subjected to a plasma treatment, glow discharging treatment, a radiation treatment, a plasma polymerization treatment, a plasma initiating polymerization treatment, a radiation polymerization treatment, a radiation initiating polymerization treatment, etc.

Also, when the electron conductive high molecular compound of the present invention is used for a battery, as a positive electrode active material, oxides, sulfides, and selenides of manganese, molybdenum, vanadium, titanium, chromium, niobium, etc.; active carbon (described in JP-A-60-167280); carbon fibers (described in JP-A-61-10882), polyaniline, an amino group-substituted aromatic polymer, a heterocyclic polymer, polyacene, a polyin compound, etc., can be used together with the electron conductive high molecular compound.

In these materials, active carbon, $\gamma$-$MnO_2$ (described in JP-A-62-108455 and JP-A-62-108457), a mixture of $\gamma$-$\beta$-$MnO_2$ and $Li_2MnO_3$ (described in U.S. Pat. No. 4,758,484), amorphous $V_2O_5$ (described in JP-A-61-200667), $V_6O_{13}$, $MoS_2$ (described in JP-A-61-64083), $TiS_2$ (described in JP-A-62-222578), polyaniline (described in JP-A-60-65031, JP-A-60-149628, JP-A-61-281128, JP-A-61-258831, JP-A-62-90878, JP-A-62-93868, JP-A-62-119231, JP-A-62-181334, and JP-A-63-46223), polypyrrole (described in West German Patents 3,307,954Al, 3,318,857, 3,338,904, 3,420,854Al, and 3,609,137Al, JP-A-60-152690, JP-A-62-72717, JP-A-62-93863, and JP-A-62-143373), polyacene and polyacetylene (described in JP-A-57-121168, JP-A-57-123659, JP-A-58-40781, JP-A-58-40781, JP-A-60-124370, JP-A-60-127669, and JP-A-61-285678), and polyphenylene are particularly effective.

The electrode active material can usually contain an electrically conductive material such as carbon, silver (described in JP-A-63-148554), a polyphenylene derivative (described in JP-A-59-20971), etc., or a cementing agent such as Teflon (trade name of Du Pont), etc.

As a negative electrode active material, metal lithium, polyacene, polyacetylene, polyphenylene, or a lithium alloy of aluminum or magnesium (described in JP-A-57-65670 and JP-A-57-98977), a mercury alloy (described in JP-A-58-111265), an Pt alloy, etc. (described in JP-A-60-79670) and a Sn-Ni alloy (described in JP-A-60-86759), a Wood alloy (described in JP-A-60-167279), alloy with an electrically conductive polymer (described in JP-A-60-262351), a Pd-Cd-Bi alloy (described in JP-A-61-29069), a Ga-In alloy (described in JP-A-61-66368), a Pb-Mg alloy, etc., (described in JP-A-61-66370), a Zn alloy, etc., (described in JP-A-61-68864), an Al-Ag alloy, etc., (described in JP-A-61-74258), a Cd-Sn alloy, etc., (described in JP-A-61-91864), an Al-Ni alloy, etc., (described in JP-A-62-119865 and JP-A-62-119866), and an Al-Mn alloy, etc., (described in U.S. Pat. No. 4,820,599) are used. In these materials, lithium metal or a Li-Al alloy are effectively used.

Then, synthesis examples of the compounds of the present invention and examples of this invention are shown below but the invention is not limited to them.

Synthesis Example (1)-1

Synthesis of compound (1)-1

While stirring a mixture of 27.8 g of m-nitrophenol, 120 ml of N,N-dimethylformamide, and 25 g of potassium carbonate at 80° C., 37 g of 2-(2-(2-chloroethoxy)ethoxy)-ethanol was added dropwise to the mixture. After stirring the mixture for one hour at 80° C., 200 ml of ethyl acetate and 200 ml of water were added to the reaction mixture and the ethyl acetate layer was extracted. The ethyl acetate layer was washed with 200 ml of water and concentrated to remove ethyl acetate to provide 2-(2-(2-(3-nitrophenoxy)ethoxy)ethoxy)ethanol (1-A).

After adding 100 ml of acetonitrile and 7.5 ml of pyridine to the compound (1-A) obtained above, 7.9 g of methacryloyl chloride was added dropwise to the mixture with stirring at a temperature of from 5° C. to 10° C. After stirring the mixture for one hour at a temperature of from 5° C. to 10° C., 200 ml of ethyl acetate and 200 ml of water were added to the mixture. The ethyl acetate layer was extracted and washed with 200 ml of water to provide and ethyl acetate solution of 2-(2-(2-(3-nitrophenoxy)ethoxy)ethoxy)ethyl methacrylate (1-B).

A mixture of 25 g of reduced iron, 1 g of ammonium chloride, 50 ml of water, and 250 ml of isopropyl alcohol was raised to a temperature of 75° C. with stirring and after adding dropwise an ethyl acetate solution of the compound (1-B) to the aqueous solution (the mixture) over a period of one hour, the resultant mixture was further stirred for 2 hours. After removing insoluble matters from the reaction mixture by filtration, 200 ml of ethyl acetate and 500 ml of water were added to the reaction mixture and the ethyl acetate layer was extracted. The ethyl acetate layer was concentrated and the residue was purified by silica gel column chromatography using chloroform as a developing solvent to provide 15.3 g of 2-(2-(2-(3-aminophenoxy)ethoxy)ethoxy)ethyl methacrylate (1-C).

The structure was confirmed by a NMR (nuclear magnetic resonance) analysis and the following elemental analysis.

|  | Elemental Analysis: | | |
| --- | --- | --- | --- |
|  | C | H | N |
| Calculated | 62.14% | 7.44% | 4.53% |
| Found: | 61.85% | 7.36% | 4.62% |

Then, while stirring a mixture of 2.5 g of (1-C), 17.5 g of n-butyl acrylate, and 100 ml of ethanol at 70° C., 0.5 g of azoisobutyronitrile was added thereto followed by stirring for 6 hours to provide a prepolymer (1-D).

By the NMR analysis and the elemental analysis, the structure of (1-D) was as follows.

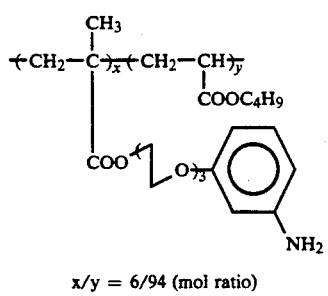

x/y = 6/94 (mol ratio)

While stirring a mixture of 10 g of (1-D), 20 g of aniline, 7.5 g of LiClO₄, 20 g of CF₃COOH, and 500 ml of acetonitrile, an electrolytic oxidation polymerization was carried out for one hour at a constant voltage method (2 V, 2 mA/cm$^2$) using Pt plates as the positive and negative electrodes to provide deposits of a polymer on the negative electrode.

By the elemental analysis, the compound (1)-1 was confirmed to have the following structure.

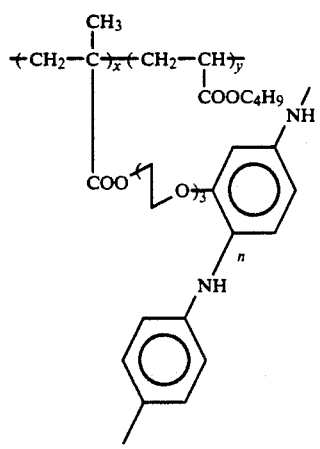

x/y = 6/94, mean n number = 50.

SYNTHESIS EXAMPLE (1)-2

Synthesis of Compound (1)-2

While stirring a mixture of 2 g of 2-(2-(2-(1-pyrrolyl)ethoxy)ethoxy)ethyl methacrylate (2-C), 18 g of n-butyl acrylate, and 100 ml of ethanol at 70° C., 0.5 g of azoisobutyronitrile was added to the mixture followed by further stirring for 6 hours to provide a prepolymer (2-D).

By the NMR analysis and the elemental analysis, the structure of (2-D) was confirmed to be as follows.

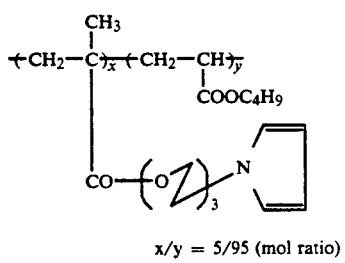

x/y = 5/95 (mol ratio)

While stirring a mixture of 15 g of (2-D), 20 g of pyrrole, 7.5 g of LiClO₄ and 500 ml of acetonitrile, an electrolytic oxidation polymerization was carried out by a constant voltage method (2 V, 2 mA/cm$^2$) for one hour using Pt plates as the positive and negative electrodes to provide deposits of a polymer on the negative electrode.

By the elemental analysis, the compound (1)-2 obtained was confirmed to be as follows.

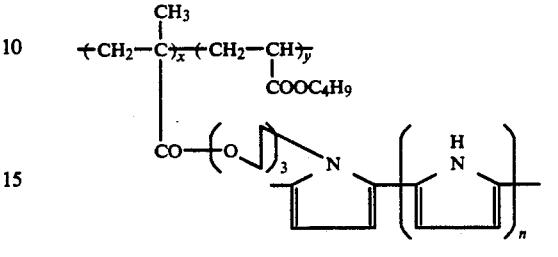

x/y = 5/95 (mol ratio), mean n number = 55.

SYNTHESIS EXAMPLE (1)-3

Synthesis of Comparison Compound (1)-1

While stirring a mixture of 20 g of aniline, 15 g of LiClO₄, 20 g of CF₃COOH, and 500 ml of acetonitrile, an electrolytic oxidation polymerization was carried out at a constant voltage method (3 V, 2 mA/cm$^2$) using Pt plates as the positive and negative electrodes for one hour to provide deposits (Comparison Compound (1)-1) on the negative electrode.

SYNTHESIS EXAMPLE (1)-4

Synthesis of Comparison Compound (1)-2

While stirring a mixture of 0.005 mol of o-aminophenetyl methacrylate, 0.095 mol of n-butyl acrylate, and 100 ml of ethyl acetate at 70° C., 0.5 g of azoisobutyronitrile was added to the mixture followed by stirring for 6 hours to provide a prepolymer (4-D).

While stirring a mixture of 20 g of (4-D), 20 g of aniline, 15 g of LiClO₄, 20 g of CF₃COOH, and 500 ml of acetonitrile, an electrolytic oxidation polymerization was carried out by a constant voltage method (3 V, 2 mA/cm$^2$) for one hour using Pt plates as the positive and negative electrodes to provides deposits (Comparison Example (1)-2) on the negative electrode.

By the elemental analysis, the comparison compound (1)-2 was confirmed to be as follows.

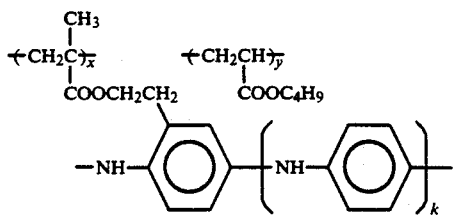

x/y = 6/94 (mol ratio), mean k number = 24.

SYNTHESIS EXAMPLE (1)-5

Synthesis of Comparison Compound (1)-3

By following the same procedure as Synthesis Example (1)-2 except that 2-(1-pyrrolyl)ethyl methacrylate was used in place of monomer (2-C), Comparison Compound (1)-3 was obtained.

By the elemental analysis, the comparison compound (1-3 was confirmed to be as follows.

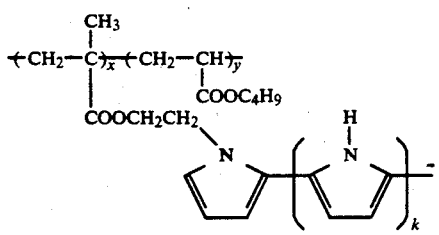

x/y = 5/95 (mol ratio), mean n number = 57.

SYNTHESIS EXAMPLE (1)-6

Synthesis of Comparison Compound (1)-4

By following the same procedure as Synthesis Example (1)-3 except that pyrrole was used in place of aniline and $CF_3COOH$ was not used, Comparison Compound (1)-4 was prepared.

SYNTHESIS EXAMPLE (1)-7

Synthesis of Compound (1)-3

A mixture of 10 g of 2-[2-{2-(4-(2-bromo)thienyl)methoxy}ethoxy]ethyl methacrylate (7-C), 40 g of VI-3 (M=H), 300 ml of ethanol, and 0.6 g of 2,2'-azobis isobutyrate was stirred for 5 hours at 80° C. under a nitrogen gas stream. After concentrating ethanol, 1 liter of nitrobenzene and 1.5 mols of iron trichloride were added to the mixture and then 0.5 mol of 2-chlorothiophene was added dropwise to the mixture at 100° C. over a period of one hour under a nitrogen gas stream. Thereafter, the resultant mixture was further stirred for 6 hours at 60° C. and nitrobenzene was concentrated. To the concentrate was added 500 ml of ethanol and after heating and extracting, the extract was purified by Sephadex column to provide 3.25 g of Compound (1)-3 of this invention. By the NMR analysis and the elemental analysis, the compound (1)-3 of this invention was confirmed to be as follows.

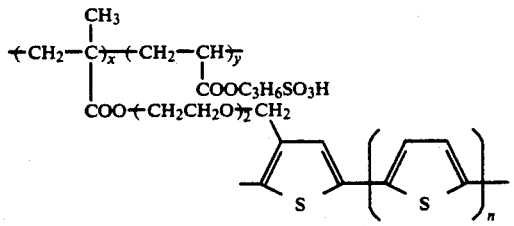

x/y = 15/85 (mol ratio), mean n number = 12

SYNTHESIS EXAMPLE (1)-8

Synthesis of Compound (1)-4

While stirring a mixture of 1 g of (1-C) obtained in Synthesis Example 1, 19 g of o-aminophenethyl methacrylate and 100 ml of ethanol at 70° C., 0.5 g of azoisobutyronitrily was added to the mixture followed by stirring for 6 hours to provide prepolymer (1-D).

By the NMR analysis and the elemental analysis, the prepolymer (1-D) was confirmed to be as follows.

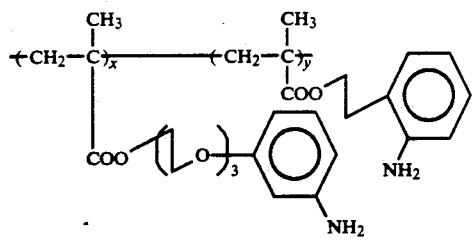

x/y = 6/94 (mol ratio)

While stirring a mixture of 1 g of (1-D), 30 g of aniline, 12 g of $LiClO_4$, 30 g of $CF_3COOH$, and 700 ml of acetonitrile, an electrolytic oxidation polymerization was carried out by a constant voltage method (3 V, 2 $mA/cm^2$) for one hour using Pt plates as the positive and negative electrodes to provide deposits of a polymer (compound (1)-4 of this invention) on the negative electrode.

By the elemental analysis, the compound (1)-4 of this invention was confirmed to have the following structure.

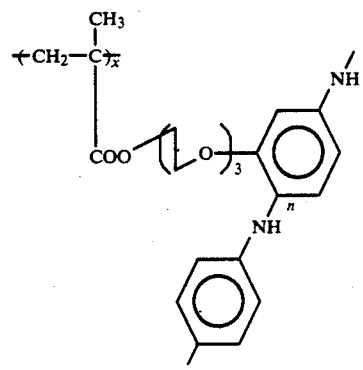

x/y = 6/94, mean (n + k)/2 number = 45

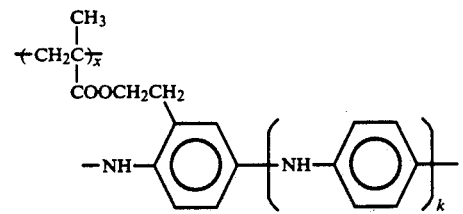

SYNTHESIS EXAMPLE (1)-9

Synthesis of Comparison Compound (1)-5

According to the method of Example 2 of JP-A-63 using sodium p-styrenesulfonate and isothianaphthene, polyisothianaphthene (Comparison Example (1)-5) was prepared.

SYNTHESIS EXAMPLE (1)-10

According to the methods of Synthesis Examples (1)-1, (1)-2, (1)-7, and (1)-8, Compounds (1)-5 to (1)-20 of this invention shown in the following table were prepared.

| Compound of Invention | A | B | C | D | x/y/z/w (molar ratio) | Average (n + k)/2 Number | Average n Number |
|---|---|---|---|---|---|---|---|
| (I)-5 | I-1 (m = 3) | IV-2 | — | — | 45/55/0/0 | 48 | — |
| (I)-6 | I-1 (m = 3) | $+CH_2-C(CH_3)+$ $COO+O+CH_3$ | — | — | 15/85/0/0 | — | 70 |
| (I)-7 | I-6 (m = 3) | $+CH_2-CH+$ $COOC_4H_9$ | — | — | 20/80/0/0 | — | 49 |
| (I)-8 | I-10 (m = 5) | IV-4 | — | — | 15/85/0/0 | 73 | — |
| (I)-9 | I-11 (m = 4) | IV-3 | VI-10 | — | 20/20/60 | 61 | — |
| (I)-10 | I-13 (m = 3) | $+CH_2-CH+$ $COOC_4H_9$ | — | — | 20/80/0/0 | — | 52 |
| (I)-11 | I-16 (m = 3) | III-8 | — | — | 10/70/20/0 | — | 57 |
| (I)-12 | I-20 | III-8 | $+CH_2-C(CH_3)+$ $COOCH_3$ | — | 45/55/0/0 | 25 | — |
| (I)-13 | I-21 | III-10 | VI-14 | $+CH_2-CH+$ $COOC_4H_9$ | 20/15/50/15 | 66 | — |
| (I)-14 | I-22 | III-13 | $+CH_2-C(CH_3)+$ $COOCH_3$ | — | 20/50/30/0 | 44 | — |
| (I)-15 | I-25 | III-20 | VI-9 | $+CH_2-CH+$ $COO+O+CH_3$ | 20/15/30/50 | 59 | — |
| (I)-16 | I-1 (m = 4) | $+CH_2CH+$ $COOCH_3$ | — | — | 20/80/0/0 | — | 53 |
| (I)-17 | I-1 | III-1 | VI-2 | — | 20/15/65/0 | 65 | — |

-continued $+A\rightarrow_x+B\rightarrow_y+C\rightarrow_z+D\rightarrow_w$

| Compound of Invention | A | B | C | D | x/y/z/w (molar ratio) | Average (n + k)/2 Number | Average n Number |
|---|---|---|---|---|---|---|---|
| | (m = 3) | | | | | | |
| (I)-18 | I-1 (m = 3) | +CH₂—CH+ COOCH₂ (cyclic carbonate) | — | — | 15/85/0/0 | — | 45 |
| | | VI-10 | | | | | |
| (I)-19 | I-2 (m = 3) | +CH₂—CH+ COOCH₂ OCH₃ (cyclic carbonate) | — | — | 20/80/0/0 | — | 50 |
| (I)-20 | I-2 (m = 5) | | — | — | 20/80/0/0 | — | 63 |

SYNTHESIS EXAMPLE (2)-1

Synthesis of Compound (2)-1

While stirring a mixture of 21.5 g of o-nitrophenethyl alcohol, 100 ml of acetonitrile, and 11.7 g of pyridine under ice-cooling, 15.3 g of methacroyl chloride was added dropwise to the mixture over a period of 30 minutes. After further stirring the mixture for one hour, 200 ml of ethyl acetate and 300 ml of water were added thereto. The ethyl acetate layer was extracted and washed with 300 ml of water to provide an ethyl acetate solution of o-nitrophenethyl methacrylate (1-A).

A mixture of 50 g of reduced iron, 0.5 g of ammonium chloride, 30 ml of water, 200 ml of ethanol, and 1 g of acetic acid was raised to a temperature of 75° C. with stirring. After adding dropwise the ethyl acetate solution of (1-A) to the aqueous solution (mixture) over a period of one hour, the mixture was further stirred for 3 hours. After removing insoluble matters from the reaction mixture by filtration, the residue was concentrated and purified by silica gel column chromatography using chloroform as a developing solvent to provide 23 g of o-aminophenethyl methacrylate (1-B). The structure was confirmed by the NMR analysis and the elemental analysis.

|  | Elemental Analysis: | | |
|---|---|---|---|
|  | C | H | N |
| Calculated | 70.24% | 7.32% | 6.83% |
| Found: | 69.98% | 7.15% | 6.97% |

Then, while stirring a mixture of 1.0 g of 1-B, 19.0 g of monomer V-2, and 100 ml of ethanol at 70° C., 0.5 g of azoisobutyronitrile was added to the mixture followed by stirring for 6 hours to provide prepolymer 1-C.

By the NMR analysis and the elemental analysis, the structure of the compound 1-C was confirmed to be as follows.

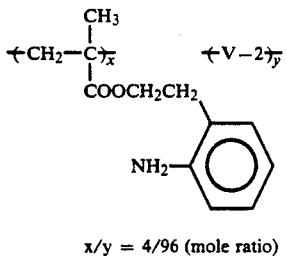

x/y = 4/96 (mole ratio)

Then, while stirring a mixture of 20 g of 1-C, 20 g of aniline, 7.5 g of LiClO$_4$, 20 g of CF$_3$COOH, and 500 ml of acetonitrile, an electrolytic oxidation polymerization was carried out by a contact voltage method (3 V, 2 mA/cm$^2$) for one hour using Pt plates as the positive and negative electrodes to provide deposits of a polymer (Compound (2)-1 of this invention) on the negative electrode.

By the elemental analysis, the structure of the compound (2)-1 was confirmed as follows.

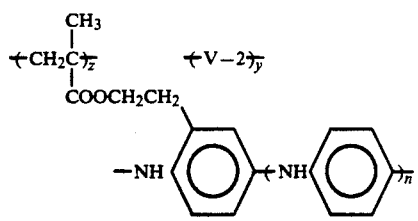

x/y = 4/97 (mol ratio), n = 44 (mol ratio)

SYNTHESIS EXAMPLE (2)-2

Synthesis of Compound (2) 2:

After stirring a mixture of 1.8 g of 1-hydroxyethylpyrrole, 1.8 g of methacryloyl chloride, 10 ml of tetrahydrofuran, and 1.8 g of triethylamine for 3 hours at 5° C., 20 ml of ethyl acetate and 20 ml of water were added to the mixture. The ethyl acetate layer was extracted, concentrated, and then purified by silica gel column chromatography to provide 2.1 g of compound 2-B. While stirring a mixture of 1.0 g of 2-B, 19.0 g of monomer V-2, and 100 ml of ethanol at 70° C., 0.5 g of azoisobutyronitrile was added to the mixture followed by stirring for 6 hours to provide prepolymer 2-C.

By the NMR analysis and the elemental analysis, the structure of the prepolymer 2-C was confirmed to be as follows.

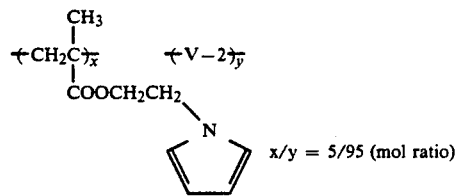

x/y = 5/95 (mol ratio)

While stirring a mixture of 20 g of 2-C, 20 g of aniline, 7.5 g of LiClO$_4$, and 500 ml of acetonitrile, an electrolytic oxidation polymerization was carried out by a constant voltage method (3 V, 2 mA/cm$^2$) for one hour using Pt plates as the positive and negative electrodes to provide deposits of a polymer (Compound (2)-2 of this invention). By the elemental analysis, the structure of the compound (2)-2 was confirmed to be as follows.

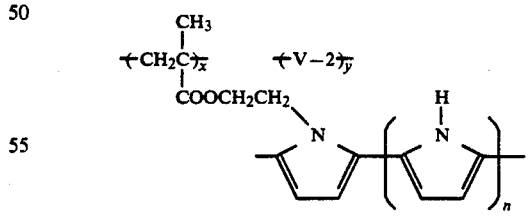

x/y = 5/95 (mol ratio), n = 53 (mol ratio)

SYNTHESIS EXAMPLE (2)-3

Synthesis of Comparison Compound (2)-1

While stirring a mixture of 20 g of aniline, 15 g of LiClO$_4$, 20 g of CF$_3$COOH, and 500 ml of acetonitrile, an electrolytic oxidation polymerization was carried out by a constant voltage method (3 V, 2mA/cm$^2$) for one hour using Pt plates as the positive and negative electrodes to provide deposits (Comparison Compound (2)-1) on the negative electrode.

SYNTHESIS EXAMPLE (2)-4

Synthesis of Comparison Compound (2)-2

While stirring a mixture of 0.005 mol of 1-B obtained in Synthesis Example (2)-1, 0.095 mol of n-butyl acrylate, and 100 ml of ethyl acetate at 70° C., 0.5 g of azoisobutyronitrile was added to the mixture followed by stirring for 6 hours to provide prepolymer (4-C).

Then, while stirring a mixture of 20 g 4-C, 20 g of aniline, 15 g of LiClO$_4$, 20 g of CF$_3$COOH, and 500 ml of acetonitrile, an electrolytic oxidation polymerization was carried out by a constant voltage method (3V, 2 mA/cm$^2$) for one hour using Pt plates as the positive and negative electrodes to provide deposits (Comparison Example (2)-2) on the negative electrode. By the elemental analysis, the structure of the comparison compound (2)-2 was confirmed to be as follows.

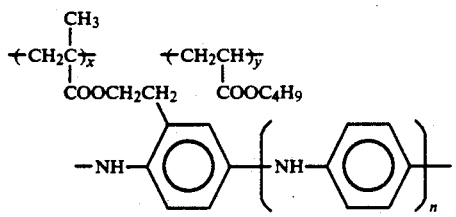

x/y = 6/94 (mol ratio), mean n number = 24

SYNTHESIS EXAMPLE (2)-5

Synthesis of Comparison Compound (2)-3

By following the same procedure as Synthesis Example (2)-2 except that butyl acrylate (BA) was used in place of monomer V-2, Comparison Compound (2)-3 was prepared.

By the elemental analysis, the structure of the comparison compound (2)-3 was confirmed to be as follows.

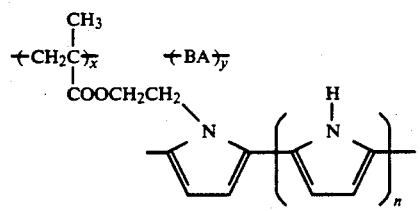

x/y = 5/95 (mol ratio), n = 57 (mol ratio)

SYNTHESIS EXAMPLE (2)-6

Synthesis of Comparison Compound (2)-4

By following the same procedure as Synthesis Example (2)-3 except that pyrrole was used place of aniline and CF$_3$COOH was not used, Comparison Compound (2)-4 was prepared.

SYNTHESIS EXAMPLE (2)-7

Synthesis of Compound (2)-3

While stirring a mixture of 0.1 mol of 2-bromo-4-2-hydroxyethoxymethylthiophene, 0.1 mol of pyridine, and 100 ml of acetonitrile at a temperature of lower than 10° C., 0.1 mol of methacryloyl chloride was added dropwise to the mixture over a period of 30 minutes. After stirring the mixture for one hour, 200 ml of ethyl acetate and 200 ml of water were added to the mixture. The ethyl acetate layer was extracted, concentrated, and purified by column chromatography to provide 22.1 g of 2-bromo-4-thienyl-methoxyethyl methacrylate (5-A).

|  | Elemental Analysis: | | |
| --- | --- | --- | --- |
|  | C | H | S |
| Calculated | 43.28% | 4.26% | 10.49% |
| Found: | 43.02% | 4.08% | 10.70% |

A mixture of 10 g of (5-A), 50 g of V-1, 10 g of VI-3 (M H), 300 ml of ethanol, and 0.6 g of 2,2'-azobismethyl isobutyrate was stirred for 5 hours at 80° C. under a nitrogen gas stream. After concentrating ethanol, 1 liter of nitrobenzene and 1.5 mol of iron trichloride were added thereto and then 0.5 mol of 2-chlorothiophene was added dropwise to the mixture at 100° C. over a period of one hour under a nitrogen gas stream. Thereafter, the mixture was stirred for 6 hours at 60° C. and then nitrobenzene was concentrated. To the residue was added 500 ml of ethanol, and after heating and extracting, the product was purified by Sephadex column to provide 3.33 g of Compound (2)-3 of this invention.

By the NMR analysis and the elemental analysis, the structure of the compound (2)-3 of this invention was confirmed to be as follows.

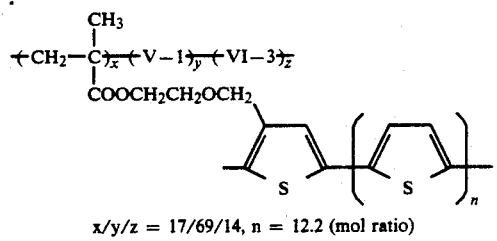

x/y/z = 17/69/14, n = 12.2 (mol ratio)

SYNTHESIS EXAMPLE (2)-8

Synthesis of Comparison Compound (2)-5

According to the method of Example 2 of JP-A-62-215772 using sodium p-styrenesulfonate and isothianaphthene, polyisothianaphthene (Comparison Compound (2)-5) was prepared.

SYNTHESIS EXAMPLE (2)-9

According to Synthesis Examples (2)-1, (2)-2, and (2)-7, Compounds (2)-4 to (2)-20 of this invention shown by the following table were prepared.

$+A\}_x+B\}_y+C\}_z+D\}_w$

| Compound of Invention | A | B | C | D | x/y/z/w (molar ratio) | Average n Number |
| --- | --- | --- | --- | --- | --- | --- |
| (2)-4 | III-1 | V-1 | — | — | 5/95/—/— | 44 |

-continued $\mathrm{(A)_{\overline{x}}(B)_{\overline{y}}(C)_{\overline{z}}(D)_{\overline{w}}}$

| Compound of Invention | A | B | C | D | x/y/z/w (molar ratio) | Average n Number |
|---|---|---|---|---|---|---|
| (2)-5 | III-1 | V-1 | VI-1 (M = Li) | — | 5/70/25/— | 40 |
| (2)-6 | III-1 | V-1 | BA | — | 4/50/46/— | 50 |
| (2)-7 | III-1 | V-1 | VI-2 (M = Li) | — | 6/55/39/— | 35 |
| (2)-8 | III-24 | V-1 | — | — | 4/96/—/— | 66 |
| (2)-9 | III-24 | V-1 | $\mathrm{-(CH_2C(CH_3))-}$<br>$\quad\quad\mid$<br>$\quad\mathrm{COOC_2H_4OH}$ | — | 7/50/43/— | 38 |
| (2)-10 | III-16 (m = 3) | V-1 | VI-2 (M = Li) | $\mathrm{-(CH_2C(CH_3))-}$<br>$\quad\quad\mid$<br>$\quad\mathrm{COOC_2H_4OH}$ | 5/35/40/20 | 42 |
| (2)-11 | III-16 (m = 3) | V-1 | VI-2 (M = Li) | BA | 5/25/50/20 | 55 |
| (2)-12 | III-8 | V-2 | — | — | 8/92/—/— | 25 |
| (2)-13 | III-10 | V-3 | VI-3 (M = Li) | $\mathrm{-(CH_2C(CH_3))-}$<br>$\quad\quad\mid$<br>$\quad\mathrm{COO(C_2H_4O)_4CH_3}$ | 2/40/35/23 | 108 |
| (2)-14 | III-13 | V-4 | VI-5 (M = Li) | $\mathrm{-(CH_2C(CH_3))-}$<br>$\quad\quad\mid$<br>$\quad\mathrm{COOCH_3}$ | 10/30/30/30 | 55 |
| (2)-15 | III-19 | V-6 | $\mathrm{-(CH_2C(CH_3))-}$<br>$\quad\quad\mid$<br>$\quad\mathrm{COO(C_2H_4O)_4CH_3}$ | — | 5/30/65/— | 62 |
| (2)-16 | III-21 | V-7 | VI-6 (M = Li) | — | 3/55/42/— | 89 |
| (2)-17 | III-25 | V-8 | $\mathrm{-(CH_2C(CH_3))-}$<br>$\quad\quad\mid$<br>$\quad\mathrm{COOCH_3}$ | — | 7/55/38/— | 38 |
| (2)-18 | III-26 | V-1 | — | — | 5/95/—/— | 43 |
| (2)-19 | III-1 | V-13 | — | — | 4/96/—/— | 56 |
| (2)-20 | III-1 | V-1 | — | — | 2/98/—/— | 220 |

EXAMPLE (1)

Electric Conductivity Measurement

The powder of each of the compounds (1)-1, (1)-2, (1)-6, (1)-9, (1)-13, (1)-16, (1)-17, and (1)-20 of this invention and each of the comparison compounds (1)-1 to (1)-5 was press-molded to provide each plate having a thickness of 0.2 mm. Then, each electric conductivity measured by a 4 probe method is shown in Table (1) below.

Scratch Strength Test

A scratch resisting test was applied to each plate obtained above using a sapphire needle having a diameter of 1 mm and a load applied to the needle when plate was scratched to leave a scratch thereon was measured and was employed as the scratch strength. The results are shown in Table (1).

Measurement of Electric Conductivity of Laminated Material

Each plate obtained above was laminated on a cast film (about 200 μm in thickness) of a high molecular solid electrolyte shown below and they were placed between stainless steel plates to provide a laminated material. The result of electric conductivity of each laminated material measured by a Cole-Cole plot method is shown in Table (1).

High Molecular Solid Electrolyte Film

In 3 g of propylene carbonate were dissolved 0.9 g of benzyl methacrylate, 0.1 g of trimethylolpropane trimethacrylate and then 0.1 g of azobisisobutyronitrile was uniformly dissolved in the solution.

The solution was casted on a Teflon plate and heated to 125° C. for one hour. The thin film obtained was immersed in a propylene carbonate/dimethoxyethane solution of $\mathrm{LiBF_4}$ ($\mathrm{LiBF_4}$: 1.4 mols, propylene carbonate: 500 ml, and dimethoxyethane: 500 ml) for one hour. The immersing operation was repeated thrice to provide the high molecular solid electrolyte film.

(The electric conductivity of the film obtained by a Cole-Cole plot method was $2 \times 10^{-3}$ S/cm.)

Continuous Charging and Discharging Test 1

An assembly formed by attaching a lithium sheet on the surface of the laminated material obtained above under pressure was placed in a stainless steel can and the opening was sealed with an insulating synthetic rubber followed by press-molding to provide a battery as shown in FIG. 1.

The features depicted in FIG. 1 are described as follows: 1: film obtained by the compound of the present invention; 2: high molecular solid electrolyte film; 3: positive electrode (lithium sheet); 4: stainless case; and 5: insulating synthetic rubber.

The battery was used as a secondary battery, a continuous charging and discharging test (electric current density 1.1 mA cm², charging and discharging depth 3.5 to 2.0 V), the discharging capacities at the 1st cycle and the 50th cycle were measured at 20° C. The results are shown in Table (1).

capacities at the 1st cycle and the 50th cycle were measured. The results are shown in Table (1).

TABLE 1

| Sample | Electric Conductivity (S/cm) | Scratch Resistance (g) | Electric Conductivity of Laminated material (S/cm) | Continuous Charging and Discharging Test 1 Charging Capacity (mAH) | | Continuous Charging and Discharging Test 2 Charging Capacity (mAH) | |
|---|---|---|---|---|---|---|---|
| | | | | The 1st Cycle | The 50th Cycle | The 1st Cycle | The 50th Cycle |
| Compound of Invention | | | | | | | |
| (1)-1 | 0.2 | >200 | $3.2 \times 10^{-4}$ | 11.5 | 11.4 | 421 | 415 |
| (1)-2 | 4.8 | >200 | $2.1 \times 10^{-4}$ | 10.9 | 10.6 | 438 | 420 |
| (1)-6 | 0.1 | >200 | $1.3 \times 10^{-4}$ | 12.6 | 12.4 | 476 | 449 |
| (1)-9 | 0.5 | >200 | $1.5 \times 10^{-4}$ | 14.2 | 14.1 | 512 | 508 |
| (1)-13 | 6.4 | >200 | $5.1 \times 10^{-4}$ | 13.8 | 13.6 | 480 | 463 |
| (1)-16 | 0.3 | >200 | $1.8 \times 10^{-4}$ | 10.7 | 10.6 | 405 | 392 |
| (1)-17 | 0.2 | >200 | $2.5 \times 10^{-4}$ | 13.5 | 13.3 | 496 | 480 |
| (1)-20 | 0.7 | >200 | $2.9 \times 10^{-4}$ | 12.4 | 12.0 | 448 | 432 |
| Comparative Compound | | | | | | | |
| (1)-1 | 0.4 | <50 | $2.6 \times 10^{-5}$ | 7.1 | 3.1 | 286 | 120 |
| (1)-2 | 0.1 | >200 | $3.3 \times 10^{-5}$ | 6.2 | 3.3 | 290 | 144 |
| (1)-3 | 5.5 | >200 | $1.1 \times 10^{-5}$ | 8.5 | 4.5 | 325 | 187 |
| (1)-4 | 6.1 | <50 | $2.2 \times 10^{-5}$ | 8.0 | 4.6 | 309 | 179 |
| (1)-5 | $1 \times 10^{-3}$ | <50 | $6.1 \times 10^{-7}$ | 0.7 | no function | 38 | no function |

Continuous Charging and Discharging Test 2

Using an assembly formed by attaching a lithium sheet on the surface of the laminated material obtained above under pressure, a tan-san type (size AA) battery shown in FIG. 2 The features depicted in FIG. 2 are described as follows: 8: pin; 9: cap; 10: insulating disk; 11: positive electrode tab; 12: negative electrode tab; 13: positive electrode; 14: high molecular solid electrolyte; 15: high molecular solid electrolyte; 16: positive electrode; 17: negative electrode; 18: safety valve; and 19: can. was prepared. The battery was used as a secondary battery, a continuous charging and discharging test (electric current density 1.1 mA/cm², charging and discharging depth 3.5 to 2.0 V), and the discharging As shown in the results in the above table, it can be seen that by the comparison of the compounds (1)-1, (1)-6, (1)-9, (1)-16, (1)-17, and (1)-20 of the present invention with the comparison compound (1)-1, (1)-2, and (1)-5 and by the comparison of the compounds (1)-2 and (1)-13 with the comparison compounds (1)-1, (1)-2, and (1)-5, the compounds of the present invention are excellent in all the properties of mechanical strength and the electric conductivity, discharging capacity, and charging and discharging cycle characteristics of the laminated material.

EXAMPLE (2)

The same measurements and tests as in Example 1 were followed using the compounds (2)-1, (2)-2, (2)-5, (2)-7, (2)-9, (2)-10, (2)-18, and (2)-20 of the present invention and the comparison compounds (2)-1 to (2)-5 and the results obtained are shown in Table (2) below.

TABLE 2

| Sample | Electric Conductivity (S/cm) | Scratch Resistance (g) | Electric Conductivity of Laminated material (S/cm) | Continuous Charging and Discharging Test 1 Charging Capacity (mAH) | | Continuous Charging and Discharging Test 3 Charging Capacity (mAH) | |
|---|---|---|---|---|---|---|---|
| | | | | The 1st Cycle | The 50th Cycle | The 1st Cycle | The 50th Cycle |
| Compound of Invention | | | | | | | |
| (2)-1 | 0.5 | >200 | $1.3 \times 10^{-4}$ | 12.5 | 12.4 | 450 | 445 |
| (2)-2 | 6.2 | >200 | $5.5 \times 10^{-4}$ | 14.4 | 13.2 | 506 | 496 |
| (2)-5 | 0.4 | >200 | $1.2 \times 10^{-4}$ | 11.8 | 11.6 | 422 | 408 |
| (2)-7 | 0.7 | >200 | $2.3 \times 10^{-4}$ | 13.5 | 13.2 | 475 | 460 |
| (2)-9 | 0.2 | >200 | $3.1 \times 10^{-4}$ | 12.6 | 12.1 | 433 | 430 |
| (2)-10 | 0.3 | >200 | $1.8 \times 10^{-4}$ | 13.4 | 12.5 | 464 | 435 |
| (2)-20 | 0.5 | >200 | $2.0 \times 10^{-4}$ | 10.7 | 10.7 | 389 | 367 |
| (2)-18 | 6.0 | >200 | $3.9 \times 10^{-4}$ | 13.8 | 12.2 | 470 | 455 |
| Comparative Compound | | | | | | | |
| (2)-1 | 0.4 | <50 | $2.6 \times 10^{-5}$ | 7.1 | 3.1 | 286 | 120 |
| (2)-2 | 0.1 | >200 | $3.3 \times 10^{-5}$ | 6.2 | 3.3 | 290 | 144 |
| (2)-3 | 5.5 | >200 | $1.1 \times 10^{-5}$ | 8.5 | 4.5 | 325 | 187 |
| (2)-4 | 6.1 | <50 | $2.2 \times 10^{-5}$ | 8.0 | 4.6 | 309 | 179 |
| (2)-5 | $1 \times 10^{-3}$ | <50 | $6.1 \times 10^{-7}$ | 0.7 | no function | 38 | no function |

As shown in Table (2) above, it can be seen that by comparing the compounds (2)-1, (2)-5, (2)-7, (2)-9, (2)-10, and (2)-20 of the present invention with the comparison compounds (2)-1, (2)-2, and (2)-5 and by comparing the compounds (2)-2 and (2)-18 of the present invention with the comparison compounds (2)-1, (2)-2, and (2)-5, the compounds of the present invention are excellent in all the properties of mechanical strength and the electric conductivity, discharging capacity, and charging and discharging cycle characteristics.

While the invention has been described in detail and with reference to specific embodiments thereof, it will be apparent to one skilled in the art that various changes and modifications can be made therein without departing from the spirit and scope thereof.

What is claimed is:

1. An electron conductive high molecular compound comprising an ethylenic repeating unit having an electron conductive moiety composed of a compound comprising at least one repeating unit of an aniline compound or a heterocyclic compound as a repeating unit at the side chain and further having a repeating unit of an oxyalkylene group at the linked portion of the repeating unit of the electron conductive moiety and the main chain thereof.

2. The electron conductive high molecular compound of claim 1, wherein the ethylenic repeating unit having the electron conductive moiety composed of a compound comprising at least one repeating unit of an aniline compound or a heterocyclic compound as a repeating unit at the side chain and further having the repeating unit of an oxyalkylene group at the linked portion of the repeating unit of the electron conductive moiety and the main chain is induced from an ethylenic compound represented following formula (I) or (II);

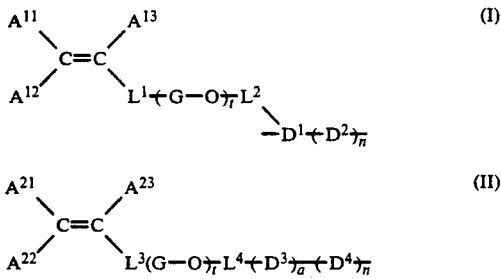

wherein $A^{11}$, $A^{12}$, $A^{13}$, $A^{21}$, $A^{22}$, and $A^{23}$, which may be the same or different, each represents a hydrogen atom, a chlorine atom, a methyl group, or a carboxy group; $L^1$, $L^2$, $L^3$, and $L^4$, which may be the same or different, represents a divalent linkage group; $D^1$, $D^2$, $D^3$, and $D^4$. which may be the same or different, each represents an aniline compound or a heterocyclic compound; a represents 0 or 1; G represents a substituted or unsubstituted alkylene group; t represents an integer of from 1 to 30; when t is 2 or more, however, Gs may be the same or different; and n represents 0 or a positive integer.

3. The electron conductive high molecular compound of claim 1 or 2, wherein the electron conductive high molecular compound further has an ethylenic repeating unit having an anionic group at the side chain.

4. An electron conductive high molecular compound comprising an ethylenical repeating unit having at least an electron conductive moiety composed of a compound comprising at least one repeating unit of an aniline compound or a heterocyclic compound as a repeating unit at the side chain and an ethylenical repeating unit at the side chain and an ethylenical repeating unit having a cyclic carbonic acid ester, a cyclic ester, or a cyclic ether at the side chain.

5. The electron conductive high molecular compound of claim 4, wherein the ethylenical repeating unit having the electron conductive moiety composed of a compound comprising at least one repeating unit of an aniline compound or a heterocyclic compound as a repeating unit at the side chain is induced from an ethylenical compound represented by following formula (III) or (IV);

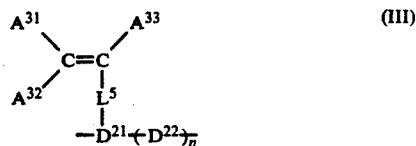

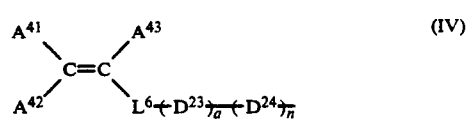

and an ethylenical repeating unit having a cyclic carbonic acid ester, a cyclic ester, or a cyclic ether at the side chain is induced from an ethylenical compound represented by following formula(V);

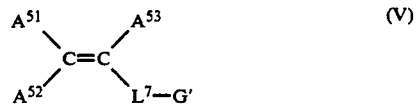

in formulae (III) to (V), $A^{31}$, $A^{32}$, $A^{33}$, $A^{41}$, $A^{42}$, $A^{43}$, $A^{51}$, $A^{52}$, and $A^{53}$, which may be the same or different, each represents a hydrogen atom, a chlorine atom, a methyl group; $L^5$, $L^6$, and $L^7$, which is the same or different, each represents a divalent linkage group; $D^{21}$, $D^{22}$, $D^{23}$, and $D^{24}$, which may be the same or different, each represents an aniline compound or a heterocyclic compound; a represents 0 or 1; G' represents a substituted or unsubstituted cyclic carbonic acid ester, a substituted or unsubstituted cyclic ester, or a substituted or unsubstituted cyclic ether; and n represents 0 or a positive integer.

6. The electron conductive high molecular compound of claim 4 or 5, wherein the electron conductive high molecular compound further has an ethylenic repeating unit having an anionic group at the side chain.

7. The electron conductive high molecular compound of claim 2, wherein said heterocyclic compound is derived from a heterocyclic ring selected from the group consisting of

pyrazole, imidazole, tirazole, oxazole, iso-oxazole, thiazole, iso-thiazole, pyridine, diazine,

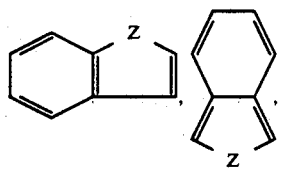

benzodiazole, benzotriazole, benzoxazole, benzothiazole, purine, quinoline, isoquinoline benzodiazine, fluorene,

acridine, phenazine, phenoxazine, pyrazotriazole, pyrazolodiazole, pyrazoloazole, and benzopyrazoloazole, wherein Z represents O, S or —N—$R^3$, wherein $R^3$ represents a hydrogen atom or a substituted or unsubstituted alkyl group having from 1 to 6 carbon atoms.

8. The electron conductive high molecular compound of claim 2, wherein each of $D^1$, $D^2$, $D^3$ and $D^4$ are selected from the group consisting of an aniline compound, a pyrrole compound, a thiophene compound and a furan compound.

9. The electron conductive high molecular compound of claim 2, wherein at least one of $D^1$, $D^2$, $D^3$ and $D^4$ are substituted by a substituent selected from the group consisting of a halogen atom, a nitro group, a cyano group, an alkyl group having from 1 to 4 carbon atoms, an alkoxy group having from 1 to 4 carbon atoms, —NHCOR$^4$, —NHSO$_2$R$^4$, —SOR$^4$, —COR$^4$,

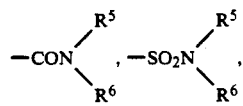

an amino group optionally further substituted by an alkyl group, a hydroxy group, and a group capable of forming a hydroxy group by hydrolysis, wherein $R^4$ represents an alkyl group having from 1 to 4 carbon atoms, a phenyl group, or an aralkyl group having from 6 to 9 carbon atoms; and $R^5$ and $R^6$, which may be the same or different, each represents a hydrogen atom, an alkyl group having from 1 to 4 carbon atoms, a phenyl group, or an aralkyl group having from 6 to 9 carbon atoms, provided that two substituents may cause a ring-condensation to form a carbon ring or a heterocyclic ring.

10. The electron conductive high molecular compound of claim 2, wherein $L^1$, $L^2$, $L^3$ and $L^4$ may be the same or different and each represents $[(X^1)_{s2} (J^1-X^2)_p (J^2-X^3)_q(J^3)_r]_s$, $\mu$, p, q, r and s each represents 0 or 1, and $J^1$, $J^2$ and $J^3$ may be the same or different and each represents: —O—, —S—, —CO—, —SO$_2$—, —OCO—, —COO—,

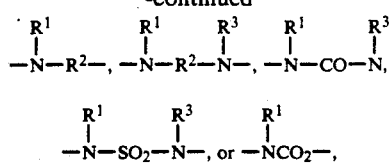

wherein $R^1$ represents a hydrogen atom, a substituted or unsubstituted alkyl group having from 1 to 4 carbon atoms or a substituted or unsubstituted phenyl group;

$R^2$ represents an alkylene group having from 1 to 4 carbon atoms; and $R^3$ represents a hydrogen atom or a substituted or unsubstituted alkyl group having from 1 to 6 carbon atoms;

$X^1$, $X^2$ and $X^3$, which may be the same or different, each represents a substituted or unsubstituted alkylene group having from 1 to 20 carbon atoms, a substituted or unsubstituted arylene group having from 6 to 30 carbon atoms, a substituted or unsubstituted aralkylene group having from 6 to 30 carbon atoms, or $(G^1—O)_{t1}—CH_2CH_2—$ wherein $G^1$ and $t_1$ have the same meaning as G and t, respectively.

11. The electron conductive high molecular compound of claim 2, wherein said repeating unit is represented by the following formula (I) repeating unit:

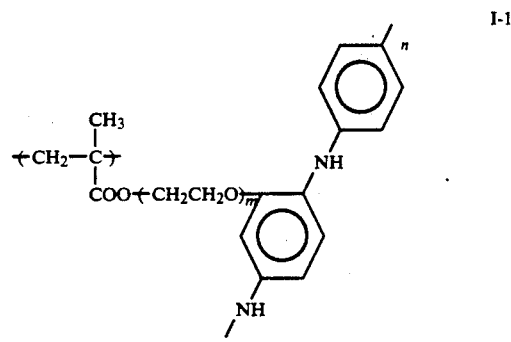

I-1 wherein m represents an integer of 1 to 30 and n represents zero or a positive integer.

12. The electron conductive high molecular compound of claim 10, wherein at least one said alkylene group, said arylene group, and said aralkylene group represented by $X^1$, $X^2$ and $X^3$ are substituted with a substituent selected from a hydroxy group, a nitro group, an alkoxy group having from 1 to 4 carbon atoms, an alkyl group having from 1 to 4 carbon atoms, —NHSO$_2$R$^7$, —NHCR$^7$—,

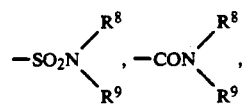

—SO$_2$R$^7$, —COR$^7$, a halogen atom, a cyano group, and an amino group, wherein $R^7$ represents an alkyl group having from 1 to 4 carbon atoms, a phenyl group, or an aralkyl group having from 6 to 9 carbon atoms, and $R^8$ and $R^9$, which may be the same or different, each represents a hydrogen atom, an alkyl group having from 1 to 4 carbon atoms, a phenyl group, or an aralkyl group having from 6 to 9 carbon atoms, and provided that two substituents may cause a ring-condensation to form a carbon ring or a heterocyclic ring.

13. The electron conductive high molecular compound of claim 5, wherein $L^5$, $L^6$ and $L^7$, which may be the same or different, each is represented by $[(X^{1'})_{\mu'}(J^{1'}-X^{2'})_{p'}(J^{2'}-X^{3'})_{q'}(J^{3'})_{r'}]_{s'}$, wherein $J^{1'}$, $J^{2'}$ and $J^{3'}$, which may be the same or different, each represents —O—, —S—, —CO—, —SO$_2$—, —OCO—, —COO—,

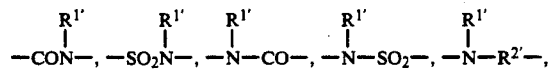

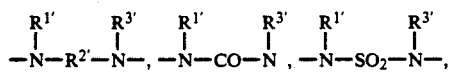

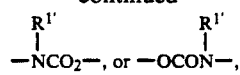

wherein $R^{1'}$ represents a hydrogen atom, a substituted alkyl group or a substituted or unsubstituted phenyl group;

$R^{2'}$ represents an alkylene group having from 1 to 4 carbon atoms;

$R^{3'}$ represents a hydrogen atom or a substituted or unsubstituted alkyl group having from 1 to 6 carbon atoms; and $X^{1'}$, $X^{2'}$ and $X^{3'}$, which may be the same or different, each represents a substituted or unsubstituted alkylene group, a substituted or unsubstituted arylene group, a substituted or unsubstituted aralkylene group or —CH$_{12}$CH$_2$—O)$_t$CH$_2$CH$_2$— wherein t represents an integer of from 1 to 30 and $\mu'$, $p'$, $q'$, $r'$ and $s'$ each represents 0 or 1.

* * * * *